(12) United States Patent
Levy

(10) Patent No.: US 9,218,429 B2
(45) Date of Patent: *Dec. 22, 2015

(54) CONTENT METADATA DIRECTORY SERVICES

(71) Applicant: Digimarc Corporation, Beaverton, OR (US)

(72) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 351 days.

This patent is subject to a terminal disclaimer.

(21) Appl. No.: 13/753,177

(22) Filed: Jan. 29, 2013

(65) Prior Publication Data

US 2013/0198242 A1    Aug. 1, 2013

Related U.S. Application Data

(63) Continuation of application No. 11/614,942, filed on Dec. 21, 2006, now Pat. No. 8,364,720.

(60) Provisional application No. 60/747,408, filed on May 16, 2006, provisional application No. 60/753,257, filed on Dec. 21, 2005.

(51) Int. Cl.
     *G06F 17/30*      (2006.01)
     *G06F 21/10*      (2013.01)
     (Continued)

(52) U.S. Cl.
     CPC .......... *G06F 17/30876* (2013.01); *G06F 17/30* (2013.01); *G06F 17/3002* (2013.01);
     (Continued)

(58) Field of Classification Search
     CPC ................................................ G06F 17/30067

USPC ......... 707/758, 781, 791, 802, 803, 809, 812, 707/999.102, 999.103; 709/225, 217, 229; 382/100

See application file for complete search history.

(56) References Cited

U.S. PATENT DOCUMENTS

| 5,907,837 A | 5/1999 | Ferrel et al. |
| 6,135,464 A | 10/2000 | Borel |

(Continued)

FOREIGN PATENT DOCUMENTS

| JP | 2001339358 | 12/2001 |
| JP | 2002297656 | 10/2002 |

(Continued)

OTHER PUBLICATIONS

Dunsire, "Distinguishing Content From Carrier", D-Lib Magazine, vol. 13, No. 1/2, Jan./Feb. 2007, 7 pages.

(Continued)

*Primary Examiner* — Syling Yen
(74) *Attorney, Agent, or Firm* — Digimarc Corporation

(57) ABSTRACT

A method of associating a content object with metadata uses a combination of a content identifier and a bounding identifier to enable handling of disparate sets of content identifiers for content objects with potentially conflicting content identifiers. The method receives a content identifier for a content object from among a set of content identifiers. It provides a unique bounding identifier for the set of content identifiers. This unique bounding identifier is used in combination with the content identifier to form a globally unique identifier for the content object. This globally unique identifier is associated with a metadata source, which enables routing of a user to the metadata source.

38 Claims, 5 Drawing Sheets

(51) Int. Cl.
*G06Q 10/06* (2012.01)
*G06Q 10/10* (2012.01)
*G06Q 30/00* (2012.01)
*G06Q 30/02* (2012.01)
*H04N 21/235* (2011.01)
*H04N 21/2389* (2011.01)
*H04N 21/25* (2011.01)
*H04N 21/258* (2011.01)
*H04N 21/435* (2011.01)
*H04N 21/4722* (2011.01)
*H04N 21/84* (2011.01)
*H04N 21/854* (2011.01)
*H04N 21/858* (2011.01)
*H04L 29/06* (2006.01)
*H04L 29/08* (2006.01)

(52) U.S. Cl.
CPC .... *G06F17/30026* (2013.01); *G06F 17/30038* (2013.01); *G06F 17/30047* (2013.01); *G06F 17/30289* (2013.01); *G06F 17/30864* (2013.01); *G06F 21/10* (2013.01); *G06Q 10/06* (2013.01); *G06Q 10/10* (2013.01); *G06Q 30/00* (2013.01); *G06Q 30/02* (2013.01); *H04L 67/10* (2013.01); *H04N 21/235* (2013.01); *H04N 21/23892* (2013.01); *H04N 21/252* (2013.01); *H04N 21/25891* (2013.01); *H04N 21/435* (2013.01); *H04N 21/4722* (2013.01); *H04N 21/84* (2013.01); *H04N 21/854* (2013.01); *H04N 21/8586* (2013.01); *H04L 65/4084* (2013.01); *H04L 67/22* (2013.01); *H04L 67/327* (2013.01)

(56) References Cited

U.S. PATENT DOCUMENTS

| | | | |
|---|---|---|---|
| 6,135,646 | A | 10/2000 | Kahn et al. |
| 6,209,036 | B1 | 3/2001 | Aldred et al. |
| 6,321,221 | B1 | 11/2001 | Bieganski |
| 6,330,572 | B1 | 12/2001 | Sitka |
| 6,889,211 | B1 | 5/2005 | Yoshiura et al. |
| 6,947,571 | B1 | 9/2005 | Rhoads et al. |
| 7,010,144 | B1 | 3/2006 | Davis et al. |
| 7,095,871 | B2 | 8/2006 | Jones et al. |
| 7,130,863 | B2 | 10/2006 | Diab |
| 7,206,820 | B1 | 4/2007 | Rhoads et al. |
| 7,209,571 | B2 | 4/2007 | Davis et al. |
| 7,231,419 | B1 | 6/2007 | Gheorghe et al. |
| 7,421,723 | B2 | 9/2008 | Harkness et al. |
| 7,450,734 | B2 | 11/2008 | Rodriguez et al. |
| 8,045,756 | B2 | 10/2011 | Hein, III |
| 8,055,667 | B2 | 11/2011 | Levy |
| 8,180,844 | B1 | 5/2012 | Rhoads et al. |
| 8,245,265 | B2 | 8/2012 | Yoon et al. |
| 9,092,433 | B2 | 7/2015 | Rodriguez |
| 2001/0034771 | A1 | 10/2001 | Hutsch et al. |
| 2002/0059580 | A1 | 5/2002 | Kalker |
| 2002/0143791 | A1 | 10/2002 | Levanon et al. |
| 2002/0152267 | A1 | 10/2002 | Lennon |
| 2002/0186844 | A1 | 12/2002 | Levy et al. |
| 2003/0012403 | A1 | 1/2003 | Rhoads et al. |
| 2003/0056103 | A1 | 3/2003 | Levy et al. |
| 2003/0105764 | A1 | 6/2003 | Kageyama et al. |
| 2003/0163724 | A1 | 8/2003 | Tayebi et al. |
| 2003/0221164 | A1 | 11/2003 | Williams et al. |
| 2004/0019658 | A1 | 1/2004 | Plastina et al. |
| 2004/0034650 | A1 | 2/2004 | Springer, Jr. et al. |
| 2004/0122741 | A1 | 6/2004 | Sidman |
| 2004/0243567 | A1 | 12/2004 | Levy |
| 2004/0243634 | A1 | 12/2004 | Levy |
| 2004/0267726 | A1 | 12/2004 | Beynon et al. |
| 2005/0131885 | A1 | 6/2005 | Komatsu et al. |
| 2005/0198061 | A1 | 9/2005 | Robinson et al. |
| 2005/0204037 | A1 | 9/2005 | Levy |
| 2005/0216454 | A1 | 9/2005 | Diab et al. |
| 2005/0251683 | A1 | 11/2005 | Levy et al. |
| 2006/0047952 | A1 | 3/2006 | Van Den Heuvel et al. |
| 2007/0073767 | A1 | 3/2007 | Springer et al. |
| 2008/0140433 | A1 | 6/2008 | Levy et al. |
| 2008/0155116 | A1 | 6/2008 | Schmelzer |

FOREIGN PATENT DOCUMENTS

| | | |
|---|---|---|
| JP | 2003288361 | 10/2003 |
| JP | 2004126975 | 4/2004 |
| JP | 2005267171 | 9/2005 |
| JP | 2005310094 | 11/2005 |
| JP | 200660426 | 3/2006 |
| WO | WO9743736 | 11/1997 |
| WO | WO2005089476 | 9/2005 |
| WO | WO2007076459 | 7/2007 |

OTHER PUBLICATIONS

INDECS, "Multimedia Rights Clearance Systems", info 2000, 5 pags.
"The indecs metadata framework—Principles, model and data dictionary", Jun. 2000, 49 pages.
"ISRC made easy", ISO 3901-ID3.org, 2006, 1 page.
"Introducing ISO/IEC 21000-3 Digital Item Identification", MPEG-21 DII, Jul. 2005, 1 page.
"ISO TC46/SC9 review of MPEG-21 Committee Draft 21000-3, Multimedia Framework—Part 3: Digital Item Identification and Description", 2002, 52 pages.
EPCglobal, "Object Naming Service (ONS), Version 1.0", EPCglobal Ratified Specification Version of Oct. 4, 2005, 24 pages.
"Introduction to ISO/IEC 21000-6 Rights Data Dictionary", MPEG-21 RDD, Jul. 2005, 2 pages.
CONTECS:DD, "ISO Publication of the MPEG Rights Data Dictionary Standard, ISO/IEC 21000-6", Jun. 2004, 3 pages.
U.S. Appl. No. 11/614,942, filed Dec. 21, 2006.
Office Action dated May 19, 2009, in U.S. Appl. No. 11/614,942.
U.S. Appl. No. 11/614,947, filed Dec. 21, 2006.
Office Action dated Aug. 17, 2009, in U.S. Appl. No. 11/614,947.
Office Action dated Jan. 15, 2009, in U.S. Appl. No. 11/614,947.
U.S. Appl. No. 11/614,921, filed Dec. 21, 2006.
Office Action dated Apr. 13, 2009, in U.S. Appl. No. 11/614,921.
Sun et al., "Handle System Protocol (ver 2.1) Specification", Network Working Group, Nov. 2003, 50 pages.
Sun et al., "Handle System Overview", Network Working Group, Nov. 2003, 20 pages.
Sun et al., "Handle System Namespace and Service Definition", Network Working Group, Nov. 2003, 39 pages.
Feb. 12, 2008, Search Report and Written Opinion for PCT/US06/62523, Publication No. WO2007/076459.
Nov. 6, 2009 Office Action, Nov. 24, 2010 Office Action, Jun. 22, 2011 Office Action, Oct. 15, 2012 Office Action and Jan. 17, 2013 Office Action in Chinese Application No. 200680053062.2 which is based on PCT Publication No.
Notice of Reasons for Rejection dated Oct. 25, 2011, in JP Patent Application No. JP2008547779.
Sakamoto, "Additional Content-Related Service/Product Offering System based on New Standards: MPEG-21 and Content ID/D01", Multimedia and Expo, 2002, Proceedings 2002 IEEE, Aug. 26, 2002, pp. 329-332.
EP06846770.3 Communication dated Dec. 29, 2011, 8 pages.
Sakamoto, "Service Gateway to Enable the Introduction of Content Related Services", NTT Cyber Solutions Laboratories Contents Distribution Project, IEEE, 4 pages, 2002.
History of the DOI Initiative, International DOI Foundation, Apr. 4, 2000.
The DOI Handbook, Edition 4.4.1, Oct. 5, 2006.
cIDF Specification 2.0, Aug. 11, 2003.
RFC 4245, International Standard Audiovisual No. (ISAN) URN Definition, Feb. 2006.

(56) References Cited

OTHER PUBLICATIONS

Examiner's Report dated Apr. 8, 2013, in Canadian Application No. 2,634,489.
Notice of Reasons for Rejection dated Sep. 3, 2013, in JP Patent Application No. JP2012028624.
EP10181423.4 European Search Report dated Mar. 2, 2012.
Final Rejection dated Mar. 28, 2014, in Chinese Patent Application No. 200680053062.2.
Office Action dated Oct. 29, 2013, in Chinese Patent Application No. 200680053062.2.
First Examination Report in India Patent Application No. 2761/KOLNP/2008, dated Sep. 25, 2014.
Davidson, "Digital Object Identifiers and Their Role in the Implementation of Electronic Publishing", IEEE 1998, pp. 59-65.

CONTENT METADATA DIRECTORY SERVICES

RELATED APPLICATION DATA

This application is a continuation of U.S. application Ser. No. 11/614,942, filed Dec. 21, 2006 (now U.S. Pat. No. 8,364, 720) which claims the benefit of U.S. Provisional Applications 60/747,408, filed May 16, 2006, and 60/753,257, filed Dec. 21, 2005, which are hereby incorporated by reference.

TECHNICAL FIELD

The invention relates to methods and systems for associating content, including both physical and electronic objects, with metadata through networks.

BACKGROUND AND SUMMARY

This document uses the terms 'content,' 'media' and 'media content' interchangeably to refer to pictures, music, movies and all of their sundry creative brethren which collectively might fall under the grand umbrella named 'creative works'. In general, a given creative work can be thought of as an entity or 'content object', and either the creative work stands alone with the sole companion of a name or an identification number, or it is somehow duplicated and packaged for a very wide variety of distribution methods and channels.

In primarily the latter case, the concept of 'metadata' has gained popularity, referring to additional creative works which have some form of explicit or implicit relationship to a given singular content object. Metadata generally refers to information associated with a content object. Typically, metadata is often associated with multimedia content, like images, and video and audio programs, and is used to refer to information about the content, such as its source, owner, content title, etc. One of the simpler forms of metadata might be bit-fields describing additional information about a content object such as an author's name or a category that the content object might naturally fall under. More complicated forms of metadata might be 'pointers' or addresses (e.g. URLs) of related content objects which, by reference, enable a user or consumer to easily access that second content object. Most generally, a key concept from a content provider and/or content distributor's point of view is that metadata can form an instant electronic relationship between a consumer experiencing one of their distributed content objects and themselves.

In this document, metadata refers to a broad class of information relating to a content object, and it applies to a broad class of content objects, including both physical and electronic objects. Metadata also includes an instruction or set of instructions (possibly distributed over one or more devices) that is executed by machine or machines to perform a behavior associated with an object (e.g., perform an on-line transaction, transmit or transfer content, authenticate/verify a user, content, access token, update/patch a program etc.). Metadata can be formatted and stored in a variety of formats. One format is XML, but there are others. The metadata for a particular content object may be distributed over different storage devices. In such a distributed storage approach, the metadata in one location includes references to metadata in other locations (such an index, pointer, address, URL, etc.).

One aspect of the invention relates to the technical infrastructure, including metadata routing and associated network services that ensure this electronic relationship can happen in the first place, and that this relationship can lead toward secondary revenue generation opportunities that may some day rival and eclipse primary media distribution revenue generation.

The business of selling packaged media or otherwise delivering specific media to a targeted audience has a long history of monetizing the primary delivery of that media. Selling records or selling 30 seconds of advertising on a television show or selling tickets to a movie each fit into the primary distribution monetization business model. The growth in the Internet and the flowering of various digital distribution channels certainly has complicated the description of primary media distribution itself, but the general notion of "packaging up" a creative work and delivering it for some explicit compensation strategy remains intact.

In a kind of direct extrapolation of the primary distribution model, Digital Rights Management (DRM) inventions and approaches have at least a decade worth of effort, design, trial, partial successes and valuable lessons now under their collective belt. Not least in these lessons are the behind-the-scenes business community wrestling and clashes of Titans surrounding the question on what might be considered a core property of DRM approaches: "who owns the standard . . . who owns the channel . . . who ultimately owns the consumer relationship?" Phrased in this way, there can be little mystery why uniform global standards are possibly decades away still.

Two somewhat different forces have arisen in the past decade or two which have not been entirely harmful to classic primary media distribution monetization, but they have nevertheless put significant pressure on businesses which rely on primary distribution revenue to look for secondary methods of monetization. At the very least, these forces have led toward fundamental changes of strategy in how primary distribution methods are exploited.

The first force is the ease with which creative works can be copied and re-distributed in an unauthorized fashion. The second force is the advent of highly distributed media distribution channels and the equally highly distributed end-devices used to experience a creative work, most certainly including mobile devices. Though these two forces are rather different from each other and though each has been partially transformed into "opportunity" by ever-entrepreneurial efforts and companies, the fact remains that both forces are unstoppably disrupting traditional approaches to the monetization of primary media distribution.

The relative ease with which creative works can be copied has been a primary fuel in creating the now familiar notion of peer-to-peer networks where folks not only share pictures from family vacations but also the latest movie they enjoyed last night. Untold years of technological ponderings and industry standards initiatives have sought to re-establish the core role of primary packaged media distribution and its associated monetization, also not without some success, but the genie does seem to be rather out of the bottle for those seeking to re-create the good old days of creation-to-consumption monetization. Coordinated primary and second monetization strategies and cash-generating mechanisms are inevitably here to stay, most likely co-opting the second force of highly distributed distribution channels and consumption devices. Of particular note is the up and coming 'mobile' media consumption trend where ubiquitous connectivity meets ubiquitous delivery.

Still missing in this inevitable balancing of primary and secondary monetization methods are the critical details of the secondary monetization methods and systems, as well as the impact of their existence on primary distribution methods and strategies. In other words, how can secondary monetization work (beyond peddling primary distribution of ring tones), and how can primary distribution production processes be seamlessly modified to put the overall media industry profit and revenue lines back onto positive and strongly growing paths? This document describes a routing system and method, along with detailed hardware and software descriptions of the system and network components which can make it work in a tremendously complicated media distribution and consumption universe.

Managing the Fountain of Metadata

Once a distributor has accomplished primary delivery of a media object to a consumer, the next best thing to "manage" is the metadata services that add value to that delivered object. This is not the slippery slope named "control" which is a word written on many a tombstone of the last decade's worth of packaging and monolithic DRM-system approaches to media consumption behaviors, it is fundamentally about managing the highest quality relationship to the individuals or groups who are naturally attracted to the media content in the first place. The initial packaging up of "good stuff" metadata into the primary delivery of the original media content was one of the main reasons a consumer will pay a modest amount for the officially sanctioned media, but it will be the ongoing access to high quality metadata, group affinities and seamless access to related media which will compel honest consumers to be honest . . . they will simply get more value for their time and money that way.

Clearly, combining a media object with static metadata or even "static links" to inherently dynamic web-based content is a developed art at this point and somewhat accounts for the ongoing vitality of primary distribution channels over some P2P network channels. In other words, packing in "good extra stuff" still sells records and movies and pictures. P2P copies can try to keep up, but the rightful distributor has a leg up on the availability of legitimately compelling content, precisely because they are the legitimate owners or distribution rights-holder.

In some advertising-based business models, content objects are distributed for free or reduced cost and provide a vehicle for advertising revenue. These models provide an opportunity for content owners to monetize content by conveying advertising within the content. Yet, to capitalize on this opportunity in distribution networks like wireless networks and the Internet, there is a need for mechanisms to tie the content consumption to revenue opportunities, such as linking the content to electronic transactions to buy related content or products and services advertised within the content.

Fortunately, there are a few common denominators of all media distribution and media consumption that will never go away and which get to the heart of ensuring a stable relationship between content providers and content consumers. One common denominator is simply identity of the content itself. Another common denominator is the existence of basic business rules and legal frameworks which collectively define the common sense notion of "legitimate distribution and consumption" and its associated notion of return on investment to the content providers. A third common denominator is the near-universal desire of consumers to have access to the best information related to the content being consumed. And finally, there is a fourth common denominator that a content provider wants to own the "rules of relationship" associated with the content they distribute: Business rules and contracts should define how legitimate and consumer-friendly metadata relationships are carried out.

One aspect of this disclosure refers to this notion as the title of this section indicates: managing the fountain of metadata that a consumer wants and will eventually expect. The other side of this coin is classic business principle behind satisfying customers: delivering the highest quality "rewards" in managing this fountain will ensure repeat business.

The raw mechanics of how this management can happen in the global cacophony of media flow provides the technical foundation for these emerging content distribution and monetization models. The careful reader will see that the described system and network mechanisms are fully complementary to DRM-based approaches in the "digitally contained" world of the Internet and classic dedicated media channel delivery networks on the one hand, and fully able to deal with complexities and steep growth of mobile device consumption on the other hand.

In one embodiment illustrated in FIG. 9, a routing system includes two primary processing engines that are used to link a media object held by a consumer to a source of metadata. The first engine, including the ID resolver and registry components, can be described as the lingua franca of identification systems, methods, technologies, etc. It can also be effectively described as a virtual "DNS for Content Objects," as this identification engine respects any and all native or monolithic approaches to content identification. Hence the qualifier "virtual" in front of DNS. Its function is to resolve a content ID based on identifying information originating from disparate content identification systems.

The second engine, the rules database and processor, determines where to re-direct the consumer based on the resolved content ID. This rules engine facilitates secondary revenue generation opportunities because it further enables the system to tailor the metadata response to provide related content, products and services. The content provider universe is complex and often has a wide variety of business interests at play. Such interests are most often encapsulated in contracts between various entities, including the artists which create works in the first place, and such contracts can be extended to the detailed rules of metadata response to normal and/or pro-active metadata requests during media consumption sessions. The quality of the response to the consumer, and the opportunity to direct consumer's to additional revenue generating activities including classic eyeballs/advertising pathways, can be enabled by this rules engine.

FIG. 9 shows the first and second engines as being part of a router system, these engines can be partitioned and distributed over devices and controlled by different participants. The rules processor and database may be partitioned from the router system and implemented in separate instantiations, each controlled by a different participant. In this case, for example, the resolver re-directs a consumer to a rules engine under the control of a participant linked to the object via the ID registry, and this rules engine, in turn, executes a rule that determines the metadata response for the consumer (e.g., a URL or set of URLs to particular metadata). The rules processor may also be executed, at least in part on a device under the client's control. In this case, for example, a set of URLs linked to the content object via the ID registry are returned to the client, which in turn, executes rules to determine the metadata response tailored to the consumer.

The good old days of selling packaged media is still with us. The content being sold is now the seed for an ongoing relationship in ways that classic "branding" could barely fathom. This disclosure details how these two core engines can be built and operated for the good of content providers and content consumer's alike.

Managing the Relationship Between Metadata and Content Objects

As noted, metadata plays an important role in managing and facilitating transactions in content objects. Some significant examples include the use of metadata in digital distribution of content, electronic commerce, and on-line searching and organization of vast stores of data (e.g., the Internet). As the digital world proliferates and there are numerous transactions in content objects, there is a compelling need to manage the association of metadata and content objects.

This need is not confined to the digital realm. Because humans live in the physical and analog realm, there will always be a need for efficient schemes for crossing back and forth between the digital and analog realms. In particular, physical objects have corresponding metadata just as electronic objects do. For example, products have corresponding metadata in the form of product information, manuals, catalogs of related products, etc. Printed objects have metadata in the form of electronic versions of the object, ownership, source, time and location of creation, etc. Physical objects link to their metadata via an identifier on or derived from the product or related documentation (e.g., packaging, labels, etc.). Metadata management technologies, thus, need to be able to support this physical/electronic interface. Emerging applications include linking physical objects to Internet related information and electronic transactions as described in U.S. Pat. Nos. 6,947,571 and 6,505,160 and International Patent Application WO 97/43736, which are incorporated by reference.

A significant aspect of managing metadata of disparate content objects is providing effective technologies and schemes for content identification. This is important in the digital realm, where there are many potentially conflicting content identification technologies and architectures. It is also important for managing metadata for physical objects in the digital realm, where identifiers extracted or derived from physical objects provide a form of digital identity of the physical object in the digital world. The metadata systems and methods in this document are designed to work with identification systems that operate in the digital realm only, as well as ones that span the digital and physical realms. The latter category includes identification methods that derive content identifiers from an electromagnetic signal captured from an analog representation of audio or images (e.g., a digital watermark, content fingerprint, visual symbology, pattern recognition, voice recognition, OCR, etc.) as well content identifiers read via electromagnetic readers of physical data carrier devices like magnetic stripes (and other magnetic data carriers), RF ID tags, smart cards, etc. For example, physical object can be identified via RFID tags, as described at www.epcglobalinc.org and in the overview document (www.epcglobalinc.org/news/EPCglobal_Network_Overview_10072004.pdf), which is incorporated by reference.

Such content identification technology provides a means to identify content objects, but the variety of content identification schemes and formats poses compatibility and interoperability challenges. Moreover, such systems cannot provide useful information without an effective system and method to associate various identifiers with the appropriate metadata.

The problems are multifold and created by the fact that digital distribution separates content from packaging, new 1-1 marketing opportunities are minimally being utilized, and digital distribution is moving forward with proprietary channels that make the value chain more complex rather than simpler.

For instance, once content is digitized information typically carried on physical packaging is lost from the content. Digital downloads are partial products, "files without packaging and related metadata". Metadata loss is central to issues surrounding digital content management, piracy and e-commerce. Manual population of multiple distribution channels' metadata repositories gives rise to human error and inaccurate metadata.

Marketing opportunities are being lost once content is distributed since content owners and retailers lose contact with the consumer. Loss of 1-1 marketing capabilities, especially with digital distribution gaining traction, leads to loss of potential revenue.

Channels of distribution (e.g., online music retailers, podcasts, social networking sites, user-generated content sites, and P2P networks) and the number of digital derivatives (ring tones, mobile videos, etc.) stemming from a single digital product are increasing. Accurate and effective content identification is an absolute requirement to manage content effectively. Content owners are currently evaluating their metadata repositories trying to understand how to streamline in a manner that is cost-effective.

Proprietary content identification and metadata systems complicate, rather than simplify, the value chain. Content is embedded with many identifiers that do not interoperate. A few proprietary systems are linking content to metadata without input of the content owners, thus increasing the number of value chain participants.

Previous initiatives to create a central content metadata repository have failed due to proprietary, political and technical issues of creating a repository rather than directory service. Content owners and retailers want to manage their proprietary metadata and participate in building the relationship with the consumer. Third party metadata companies, and related companies, such as those that organize, classify, search and provide search results based on metadata (such as search engine providers), stand to profit from potential unauthorized use of content owners' metadata.

This document describes systems and methods for associating metadata with content objects. It describes embodiments of novel routing methods and systems referred to as content metadata directory services.

Globally Unique Identifier Scheme

One novel method of associating a content object with metadata uses a combination of a content identifier and a bounding identifier to enable handling of disparate sets of content identifiers for content objects with potentially conflicting content identifiers. The method receives a content identifier for a content object from among a set of content identifiers. It provides a unique bounding identifier for the set of content identifiers. This unique bounding identifier is used in combination with the content identifier to form a globally unique identifier for the content object. This globally unique identifier is associated with a metadata source, which enables routing of a user to the metadata source.

This approach effectively manages cases where an ID provider pre-assigns a set of content identifiers to objects, and then later registers them in our novel directory system. It also manages cases where the directory system assigns the content identifier prior to insertion of the content identifier in the content object by an ID provider.

As set forth in the CMDS embodiments, the unique bounding identifier may comprise an ID provider identifier. For example, RFID, EPC, digital watermarking and fingerprinting technology providers can serve as ID providers in the system with overlapping content ID numbers, but unique ID provider IDs. Each ID provider may also use an ID version to distinguish different versions of its technology or content ID spaces.

After appropriate registration, the directory system is used to route users to a metadata source. For example, the user (e.g., the reader executing on the user's device) provides the content ID from the content object and the bounding identifier. The directory system, in turn, routes the user to the metadata source associated with the globally unique identifier for the content object.

Metadata Directory Supporting Content Objects with Multiple Content Identifiers

Another novel method addresses content objects with two or more content identifiers, potentially referencing different metadata sources. This method registers different globally unique identifiers for a content object. These globally unique identifiers each comprise a content identifier provided with the content object and a bounding identifier identifying a set of content identifiers of which the content identifier is a member. For each of the globally unique identifiers, information is maintained about a metadata source. The method receives a first content identifier for the content object, and uses a bounding identifier associated with the set of the first content identifier to determine the globally unique identifier for the first content identifier. The user is routed to the metadata source associated with globally unique identifier.

This approach handles a variety cases in which two or more content identifiers are provided for a content object for the purpose of registration or resolution. The metadata directory system supports and manages both the registration of and routing to different metadata sources corresponding to different content identifiers of the content object. These cases include:

1. Content identifiers are embedded or calculated by different ID providers and are later derived from the content object using different readers associated with those technologies. For example, the readers are different because they derive the content identifier using different content identification methods (e.g., through the file header/footer, digital watermark, fingerprint, Vertical Blanking Interval data in video programming, etc).

2. The different readers may, for example, derive the content identifiers using different attributes of the content object. These different attributes may comprise different types of embedded auxiliary data (different watermark embedders/readers, watermark vs. embedded header/footer data). These different attributes may comprise attributes from which different digital watermarks or robust hashes are derived. The different attributes may correspond to in band and out of band attributes of the content object. "In band" refers to an identifier derived from content in the content object that is rendered for perception by a human. "Out of band" refers to auxiliary data carried in the content object but not forming part of the content that is rendered for perception by a human. Certain types of content objects include multiple content programs rendered for perception by a human, like video and audio tracks and close captioned text. In band identifiers may be derived from one or more of these content signals within the content object. In some cases, one content program may be embedded in another content program within a single content object, such as where close captioned text is embedded in the audio or video program of an audiovisual work.

3. The different content identifiers for a content object may be derived from the content object using different parts of the content object, including different in band and out of band parts as well as different parts within the in band portion of the object and different parts within the out of band portion. These parts may be in discrete locations in one domain of the content signal, yet at overlapping locations in others. Examples of domains include spatial, temporal and transform domains (e.g., frequency domain, compressed domain, etc.) of the content signal in a content object).

Enabling Different ID Provider and Content Provider Participants

In some metadata systems, the system owner, serving as a registration authority (RA), provides the identification technology and content owners use the technology to register themselves as a content provider, register content and link the content to metadata.

This document describes a novel system that enables multiple identity providers (ID Providers) to register and use the system. The ID Provider registers with a metadata directory system, receives a unique bounding identifier, and uses this bounding ID (e.g., an ID provider ID) with subsequent interactions with the metadata directory system. Separately, metadata source providers register metadata sources with the metadata directory system. This enables many different participants to associate content objects with metadata sources using one or more identity providers. Examples of metadata source providers include content providers, like content owners or retailers that have the flexibility of working with different ID providers to associate content objects with metadata. Both content providers and ID providers can register and use the system. The metadata source is the system or device that provides the metadata, like a web site. The directory system uses an identifier for the metadata source, which enables it to maintain an association between a content object and its corresponding metadata source. For example, in some embodiments, a URL serves to identify the location of the source.

One embodiment of the directory system is referred to as CMDS. CMDS enables content providers to utilize the CMDS to knit together metadata sources that are associated with content using disparate and previously incompatible ID provider technologies. CMDS enables content providers to manage their proprietary information (i.e. they do not have to turn over control of proprietary metadata to a RA for storing and distributing the metadata), enables eCommerce for all value chain participants (e.g., both content owners and retailers can embed CIDs), facilitates interoperability with all content identity provider technology (even pre-existing ID systems, such as EPC), allows for compatibility with both PC and mobile devices, facilitates interoperability for multiple ID providers who license a common identification algorithm, and enables usage reporting and vital marketing statistics.

DETAILED DESCRIPTION

Figure 1:
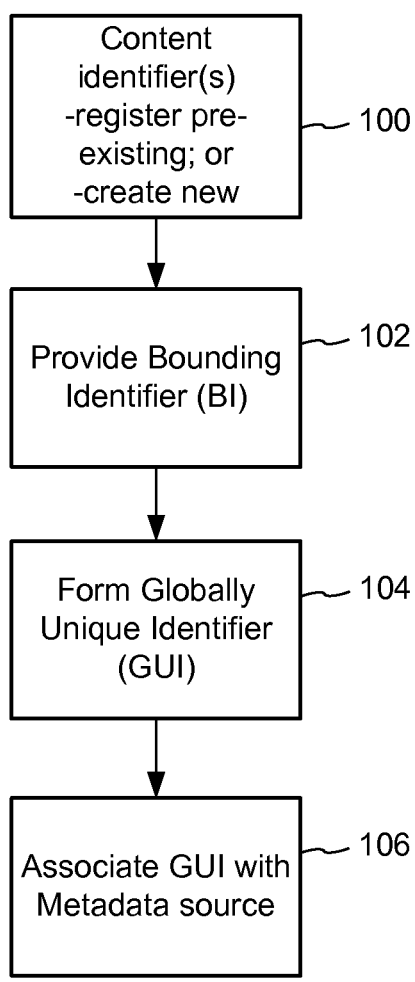
FIG. 1 is a flow diagram illustrating a method of associating a content object with a metadata source.

FIG. 1 is a flow diagram illustrating a method of associating a content object with a metadata source. This diagram is intended to show how a content metadata directory system performs registration of content IDs, which achieves two objectives:

1. it enables integration of different content identification schemes with potentially overlapping content ID schema; and 2. associates the each content ID with one or more metadata sources.

As shown in block 100, the directory system receives content IDs. These content IDs either originate from pre-existing sets (e.g., pre-assigned by an ID provider), or directory system itself issues content IDs for an ID provider upon request. The ID provider refers to an entity that provides content identification for content objects. Typically, this is a content identification technology provider, such as a provider technology for computing in band (e.g., watermarking or fingerprinting) or out of band identifiers (DRM container technologies, VBI inserters, etc.) for content objects.

To differentiate among different sets of content IDs, the directory system provides a unique bounding identifier (BI) as shown in block 102 for each unique set of content IDs registered in the directory. It ensures that BI's for different sets of content IDs do not collide. Thus, while it is possible to register pre-existing BI's that do not collide, it is preferable for the directory system to issue the BI's or at least issue guidelines for their use to prevent collisions.

The directory system forms globally unique identifier (GUI) for all content objects that it manages by combining the content ID for an object with the BI for the set of content IDs of which the content ID in question is a member (block 104).

The directory system associates the GUI for a content object with a metadata source as shown in block 106. As explained below, this metadata source provides metadata in response to a request from an entity that supplies the content ID for a content object. The directory system stores the association between the GUI of a content object and the metadata source in a manner that enables fast, efficient routing of the requesting entity to the metadata source. In one implementation, the directory system stores a location of the metadata source on a network, such as a URL. This enables the requesting entity to connect to the metadata source and retrieve metadata associated with the content object. Several metadata sources may be associated with a GUI and returned to a requesting entity.

Figure 2:
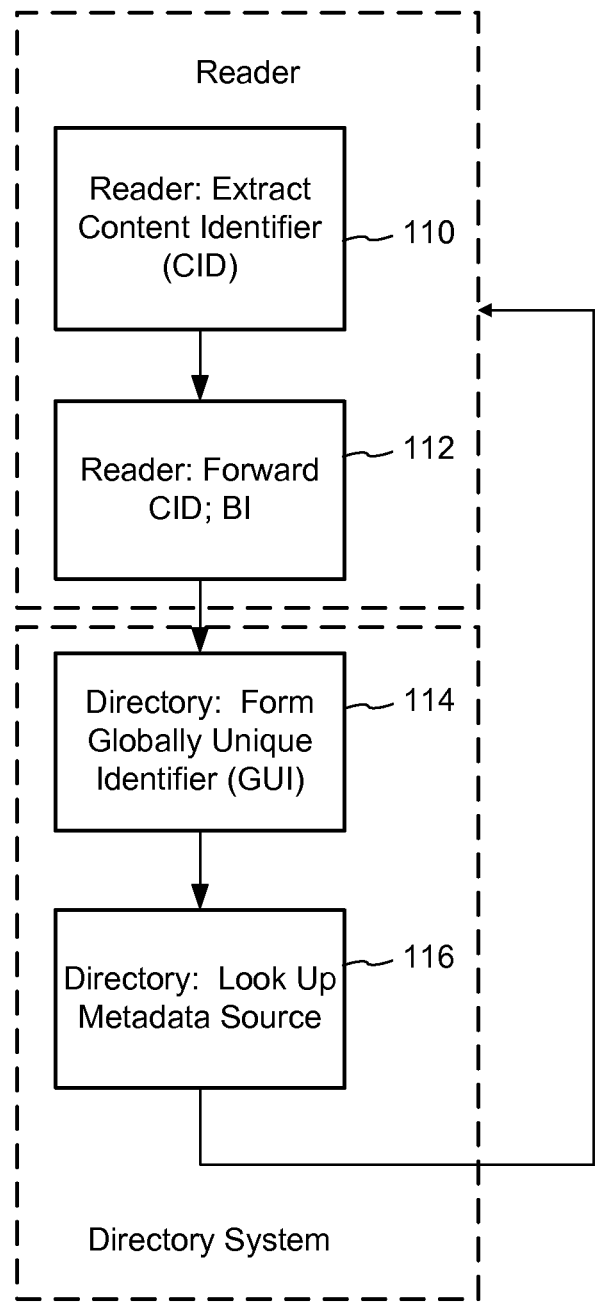
FIG. 2 is a flow diagram illustrating interaction between a reader and a directory system to link a content object with a metadata source.

FIG. 2 is a flow diagram illustrating interaction between a reader and a directory system to link a content object with a source of metadata. As shown in block 110 the reader extracts a content identifier from a content object. It then forwards the content ID to the directory system and either implicitly or explicitly identifies the BI for the set of content IDs in which the extracted content ID is a member (112). An example of explicitly identifying the BI is where the reader supplies a unique provider identifier assigned to it, along with a version identifier. The version identifier may be used to enable the provider of the identification technology to create different content ID sets, which enables flexibility with different versions and upgrades of the ID provider's technology. Some examples include different versions of a particular RFID, bar code, digital watermarking, fingerprinting or DRM technology for different customers, applications or content object groupings.

An example of implicitly identifying the BI is where the directory system determines the identity of the provider based on some inherent attribute of the data provided by the reader, such as its format, data type, etc.

The directory system forms the GUI using the received content ID from the reader and the BI (114). The precise manner of formation may vary. One approach is to concatenate the content ID and BI in some fashion (e.g., appending them together to create one GUI). Another approach is to hash one or more parts of the content ID and BI and combine these parts to create one GUI. It is possible that one or more third parties may be involved in the process of supplying the content ID and BI parts of the GUI. For example, a fingerprinting database may supply the content ID and the BI associated with it. Yet another approach is that each ID is located in a separate field in the database, and only entries that match all ID fields are used to register or resolve the GUI. The directory system maps the content ID and BI into a naming, numbering or address space which provides a GUI for each content object.

The directory system then looks up the metadata source or sources associated with GUI (116) and returns some identification of the source to the reader. One form of source identification is its URL, but other forms of identification are possible as well. Examples include a pointer, address, index to a database of metadata, machine instruction for accessing the source. The approach of returning an identification or location of the source to the reader enables the reader to establish a direct connection with the source to get the metadata. In alternative approaches, the directory system can instruct the source to establish a connection with the reader by providing the reader's address. The directory system may also act as an intermediary between the reader (or location specified by the user of the reader), on the one hand, and the metadata source on the other. This approach can be used where the directory, or some other intermediary in communication with it, is used to provide additional processing of the metadata before supplying it to the requesting entity at a location of the requesting entity's choosing.

Figure 3:
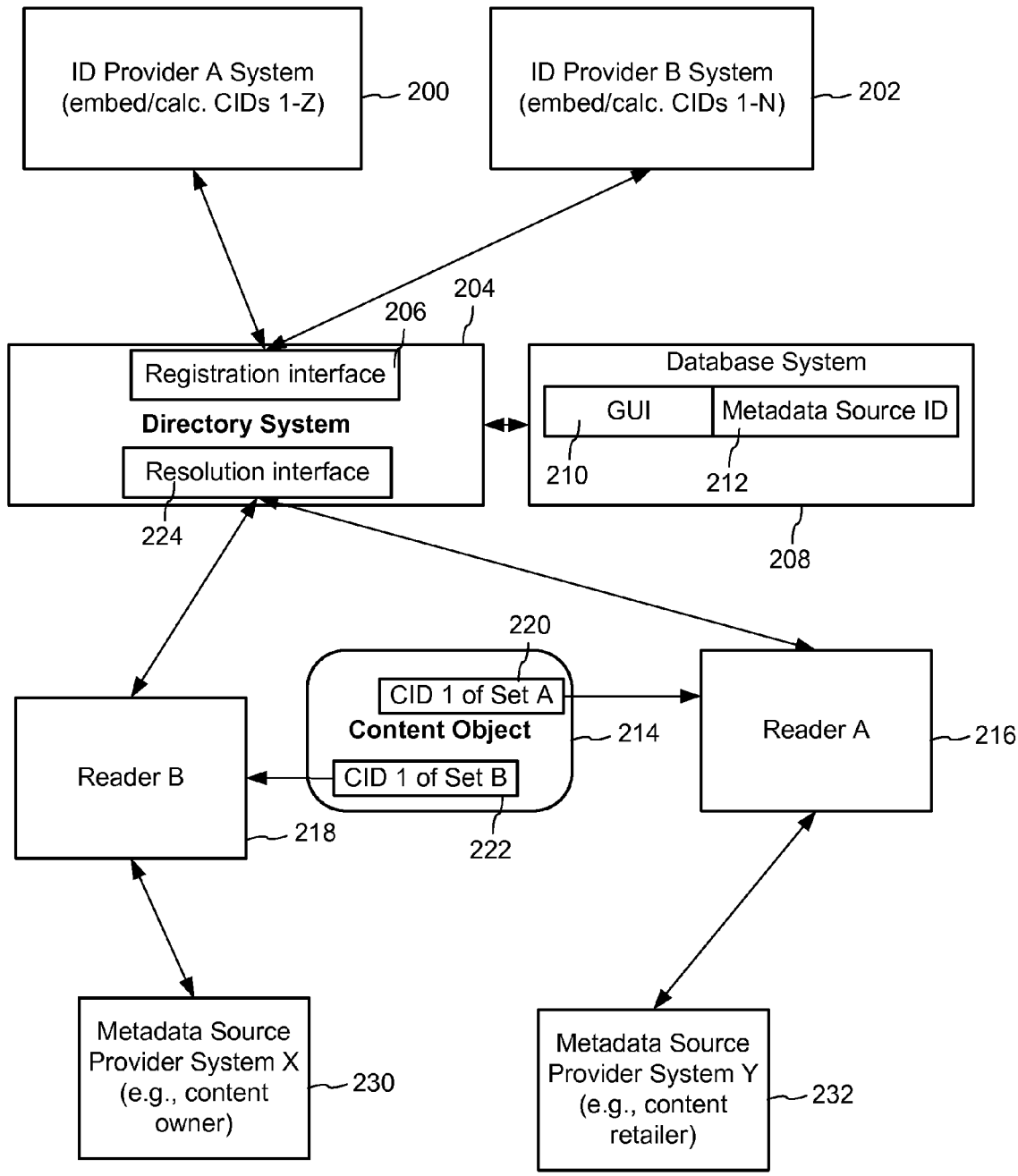
FIG. 3 is a system diagram illustrating a metadata directory system and its interaction with ID providers for registration of content IDs and readers for resolution of content IDs.

FIG. 3 is a system diagram illustrating a metadata directory system and its interaction with ID providers for registration of content IDs and readers for resolution of content IDs. As shown, different ID provider systems 200, 202 establish sets of content IDs corresponding to content objects. The ID provider systems may pre-assign sets of content IDs to objects and then register with the directory system 204 them via the directory system's registration interface 206. Or, they may request the directory system 204 issue content IDs via the registration interface 206.

The directory system includes and/or communicates with a database 208 that stores the association of the GUI 210 for each content object and its corresponding metadata source ID 212. FIG. 3 shows a generalization of the association of a GUI to a corresponding metadata source. This database can be structured with one or more layers of indirection in which aspects of the GUI are used to index into different handlers and/or databases segmented by provider, version, location, etc.

FIG. 3 illustrates the point that different ID providers (e.g., providers A and B) or different versions of a single provider's technology (Versions A and B) can register multiple sets of content IDs with the directory system. Moreover, multiple content IDs from different sets may be associated with the same content object 214. For example, ID provider A and ID provider B distribute readers A and B (216, 218), respectively. These readers may be programs, devices, or a combination thereof (including components of a device or distributed over different devices, such as in a web services type implementation). In this depiction, content object 214 includes CID 1 of set A (220) and CID 1 of set B (222). A single program or device such as a media player program or device may include both readers A and B and present a common graphical user interface to the user. Alternatively, the readers may be separate components or programs executing within the user's device or network domain.

When the readers 216, 218 encounter the object, such as upon file open/copy/transfer/edit command, entry into a device, network gateway or filter, they extract the content ID and forward it (along with the implicit or explicit BI data) to the directory system's resolution interface 224. The resolution interface, in response, looks up the metadata source ID or IDs if there are multiple sources (e.g., a URL or set of URLs) and returns them to the respective readers (or some program or device designated by the readers or pre-registered with the directory system).

The readers 216, 218 then use the metadata source IDs to establish connections with the respective metadata source provider systems 230, 232 and get the metadata associated with the content object 214 from these different sources. For example, these sources may be web content files on web servers located at the location returned by the directory system. These sources may be maintained or controlled by different participants in the content distribution value chain, such as content owners, retailers, catalog companies, product manufactures, service providers, etc. One source of metadata may be the content owner, which provides web content affiliated with the content owner, and another source of metadata may be the content retailer, which provides web content affiliated with the retailer (e.g., such as eCommerce opportunities to buy related entertainment content or merchandise).

The specification provides detailed embodiments of technology summarized above as well as additional inventive systems and methods. FIGS. 4-8 are briefly summarized here, are further illustrated with examples in connection with a system called CMDS.

Figure 4:
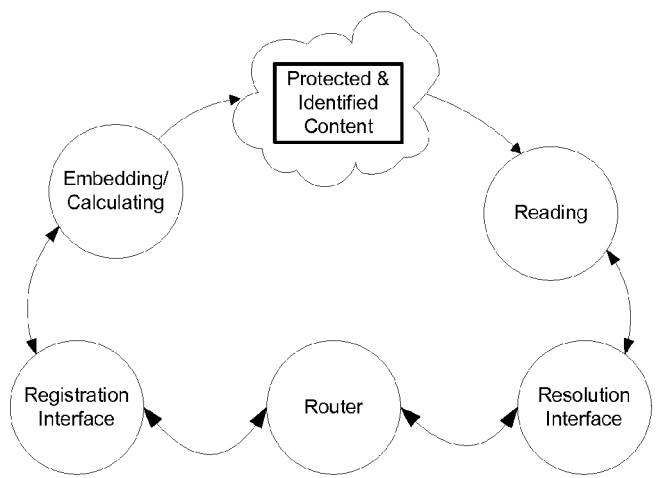
FIG. 4 is a system diagram illustrating an overview of a content identification and routing system.

FIG. 4 is a system diagram illustrating an overview of a content identification and routing system.

Figure 5:
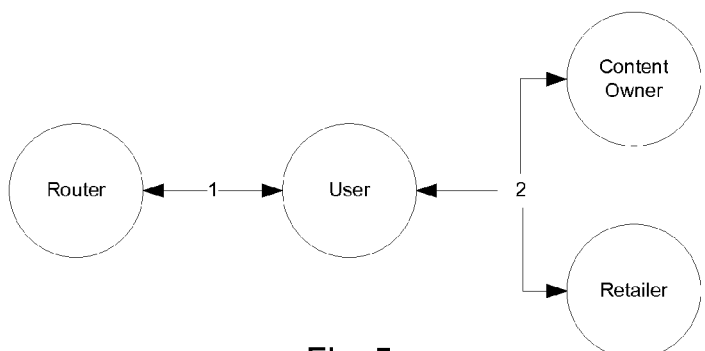
FIG. 5 is a diagram demonstrating a usage model of using the routing system to direct a user to content providers based on content identifiers extracted from the user's content object.

FIG. 5 is a diagram demonstrating a usage model of using the routing system to direct a user to content providers based on content identifiers extracted from the user's content object.

Figure 6:
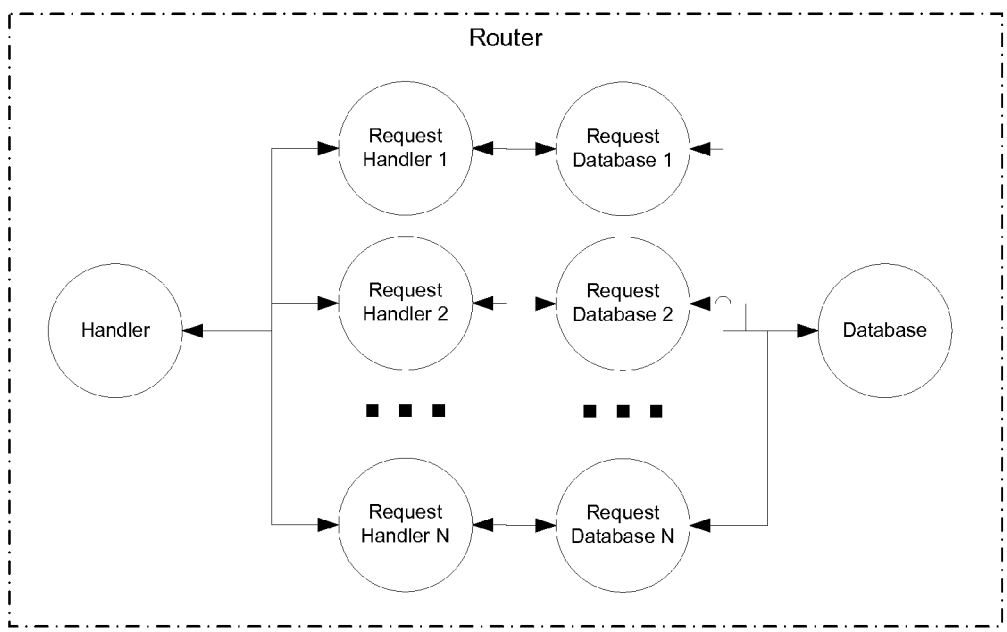
FIG. 6 is a diagram illustrating an implementation of a router in more detail.

FIG. 6 is a diagram illustrating an implementation of a router in more detail.

Figure 7:
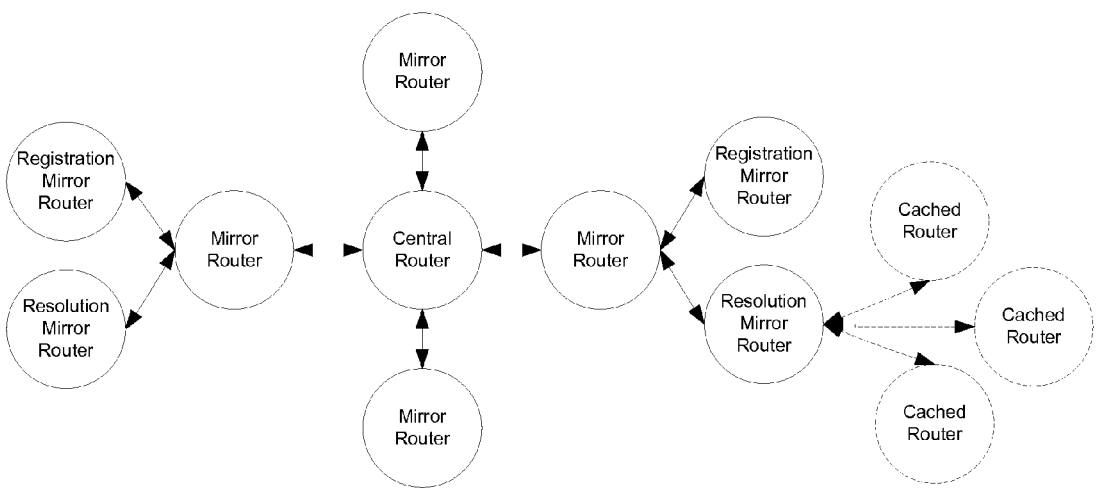
FIG. 7 is a diagram illustrating a distributed router system in one implementation of a directory system.

FIG. 7 is a diagram illustrating a distributed router system in one implementation of a directory system.

Figure 8:
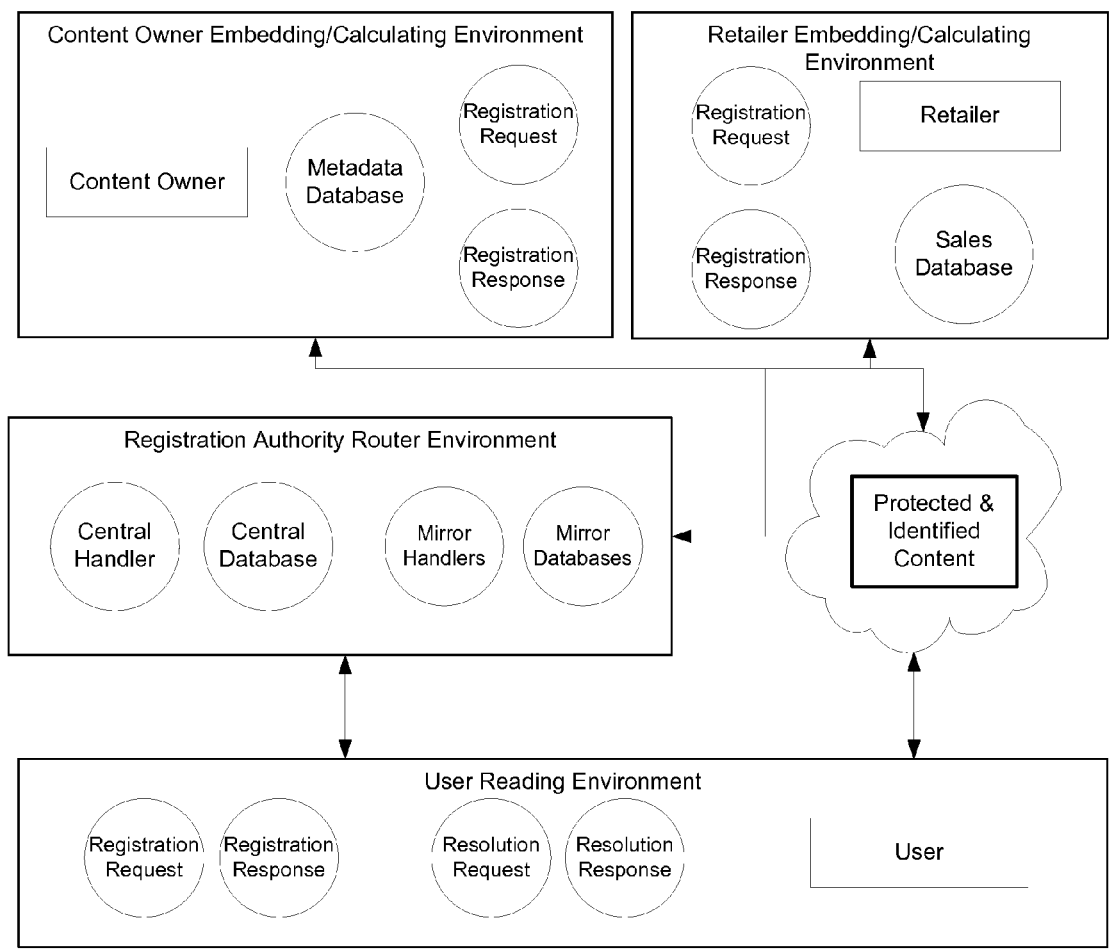
FIG. 8 is a diagram illustrating an example of a directory system architecture along with different content owner participants using the system to associate content identifiers with metadata sources they control.

FIG. 8 is a diagram illustrating an example of a directory system architecture along with different content owner participants using the system to associate content identifiers with metadata sources they control.

As summarized above, the system works with many different content identification technologies for both electronic and physical objects. It also applies for both out of band and in band content identification. Examples of out of band content identification for content objects include identification based on auxiliary data in file headers and footers, Vertical Blanking Interval (VBI) inserted data, DRM container schemes for identifying content signals in the container, etc.

The following describes some examples of in band content identification in more detail.

Digital Watermarking

One method for in-band content identification is to carry a content identifier in a digital watermark embedded in the perceptual portion of a content object that is rendered for display or playback to a human. The digital watermark is hidden or "steganographically embedded" in the content by modifying the content to include an auxiliary signal that conveys auxiliary data (e.g., a message "payload"), such as the content identifier.

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,122,403 and 6,614,914, which are hereby incorporated by reference.

Robust Content Hashes and Fingerprinting

Another method of in-band content identification is a hash of the content data, which is sometimes referred to as a content "fingerprint." In order to remain unchanged through distortion of the content, a robust form of hash is sometimes used in which the hash is derived from features of the content that are expected to survive in tact through distortion in the delivery channel, like clipping, time or geometric changes, compression, transmission, etc. Examples of these features include a vector of frequency domain values (e.g., e.g., robust low and mid frequencies), perceptually important features (including temporal, spatial or frequency domain features), content statistics, feature values quantized into discrete bins, all of which are not necessarily mutually exclusive, and which are generally characterized in that they are not degraded by expected distortion in the channel (e.g., compression, transmission, D to A, and A to D conversion). To be clear, robust fingerprinting methods allow some change in the content signal, yet the fingerprint computed from that distorted signal still maps to the same identifier. In other words, expected degradation does not change the signal so substantially that it maps to a different fingerprint in the database or no fingerprint at all. For consistency, we refer to these methods as fingerprinting, which generate content fingerprints.

This fingerprinting approach to content identification has the advantage that the auxiliary data embedding process is unnecessary. Instead, the reader process can generate the identifier from the content object without prior explicit modification of the content object to include auxiliary identifying data. A potential disadvantage is that copies of the same content program (e.g., the same musical track, song, movie) have the same fingerprint, which requires use of additional means to differentiate different copies of the same content program. The advantage of not requiring auxiliary embedding is also mitigated by the fact that the fingerprint needs to be registered and kept in a fingerprint database to enable matching of a computed fingerprint with registered fingerprints. Once a match is found, the database provides the content identifier for the matching fingerprint. This potentially adds additional processing and network communication to produce the content identifier.

For ease of understanding in the context of our architectures, we describe fingerprint methods as including three components, a calculator, a reader and a fingerprint database. The calculator does the following: (1) creates the fingerprint using the same (or similar, where changes are based upon known or estimated distortion) algorithm as the reader, (2) registers the fingerprint in the fingerprint database, and (3) links the fingerprint to a content identifier. The fingerprint may be one value or a set of sub-fingerprints taken from portions of content throughout some or all of the content. When sub-fingerprints are used, each sub-fingerprint or set of sub-fingerprints links to the same content identifier. The reader computes a fingerprint (e.g., set of sub-fingerprints), sends them to a fingerprint database, and receives the content identifier.

The fingerprint algorithm, as used in the calculator and reader, utilizes the perceptual content signal. The fingerprint is a numerical construct (e.g., an array of values) derived from a content signal that serves as a statistically unique identifier of that signal, meaning that there is a high probability that the fingerprint was derived from the content signal in question rather than a different one that sounds or looks similar. One component of fingerprint algorithm is a form of hash algorithm. The hash algorithm may be applied to a selected portion of a content signal (e.g., the first 10 seconds) to create a fingerprint, or may be applied repeatedly to generate a sequence of robust hashes, where a specified sub-set of this sequence can identify content. For example, the sequence may use sub-fingerprints from every $1/16$ second of a song, and require 32 sub-fingerprints (i.e. any 2 seconds of audio) to identify the audio. In addition, 3 seconds can be used to improve accuracy.

Directory System Applications

As noted, the directory system and method are applicable to both electronic and physical content objects (as well as objects that pass to and from analog and digital domains). The network methods for communicating and routing a device (such as computer or wireless phone handset) having a content object to another having metadata relating to the content object apply to different types of networks, including computer networks like the Internet, and wireless telephone networks. Examples of mobile device applications, such as linking from an object to its metadata via a cell phone handset, are described below. The router can be implemented in the cell phone network, the Internet, or spanning both the cell phone and Internet, such as when mirror routers reside in the cell phone network, the Internet or both the cell phone and Internet network. Different types of URLs such as WAP, WMI and "full" may be used as metadata source identifiers maintained in the directory system.

Metadata Routing and Rules

A content metadata directory system enables those having control over a content object to associate a metadata response with the content. In many applications, it is advantageous to allow different metadata responses for a particular content object. We refer to the instructions and/or data within the system that control the metadata response as "rules." One example of a rule in the directory system is data or instructions specifying the URL or list of URLs to return in response to a metadata request specifying a particular content ID. In some cases, more complex rules are needed to support metadata responses tailored to a particular context, such as user attributes (e.g., user preferences, security, account information and status, location, etc.) or transaction attributes.

Figure 9:
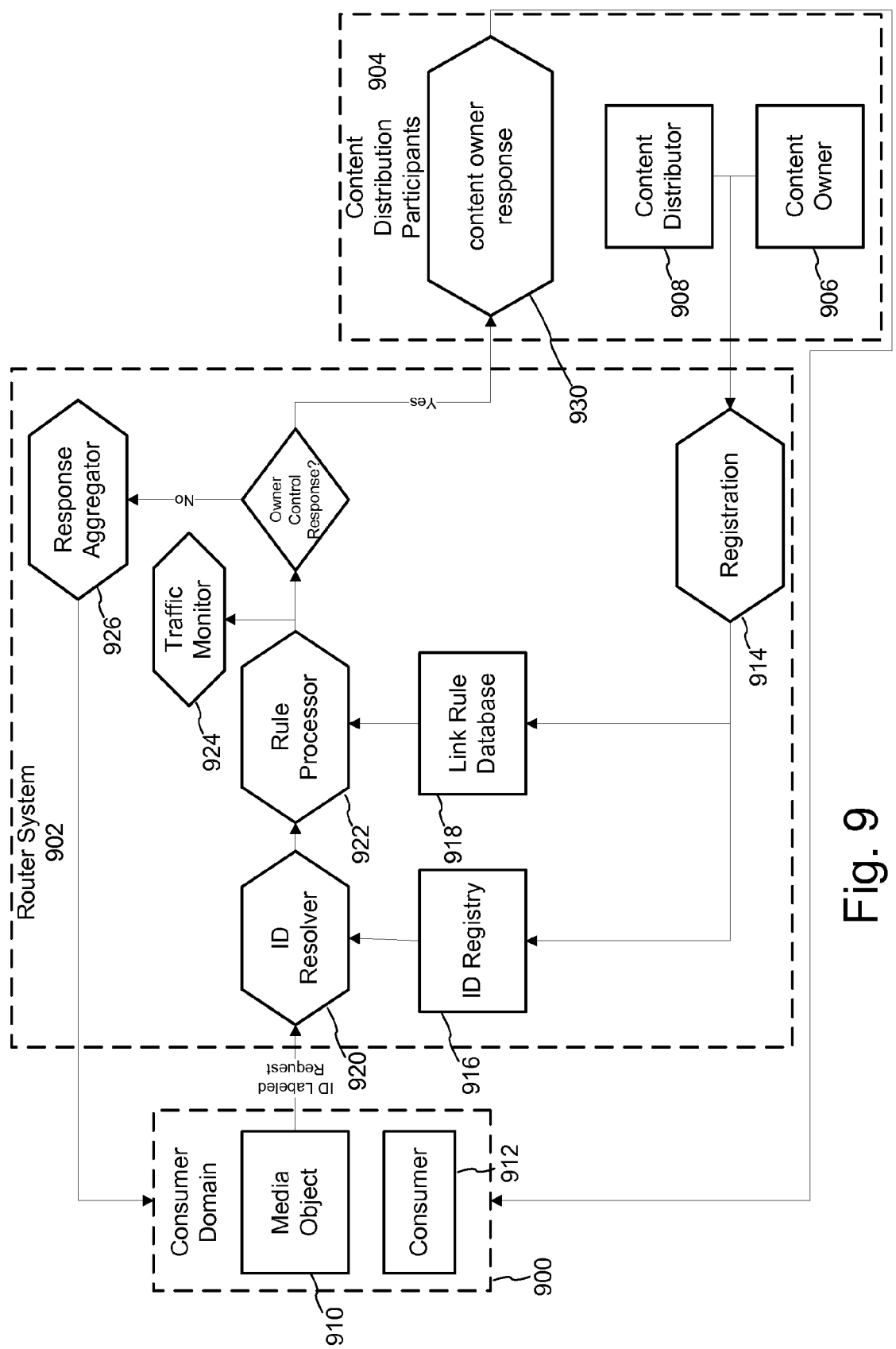
FIG. 9 is a diagram illustrating a routing system including a rules processor and traffic monitor.

To illustrate an implementation of these rules, it is instructive to begin with a diagram showing the components of a router system in which these rules operate. FIG. 9 is a block diagram illustrating a router system and its relationship with a consumer and content distribution participants. In this diagram, there are at least three entities represented: the consumer, the router service provider(s) and content distribution participants. FIG. 9 shows a configuration in which the components of the router system are distributed across these participants. The components comprise devices and/or software modules and examples of these are provided throughout this document. One set of components are referred to as part of the consumer domain 900. These are components that the consumer control's such as his or her devices and embedded software in these devices (such as wireless phone, home network, PC, home entertainment system devices, etc.). Another set are referred to as the router system 902. These are components involved in routing from content identification and related context to a metadata response, as well as related network services, such as metadata traffic monitoring and response aggregators. A final set are referred to as the content distribution participants 904. These are the participants that provide content objects, manage their distribution, and supply and/or control metadata content distribution.

The content distribution participants 904 include, but are not limited to, content owners 906 and content distributors 908. These owners include not only traditional providers of entertainment content, but also those that provide content, including advertising, used to market other products and services. These participants register their content objects 910 with the router system 902 and distribute them to consumers 912. Through a registration component 914, the participants 904 register their content objects in the routing system as described in the various embodiments in this document. In particular, they provide content identifiers and associated rules for providing responses to metadata requests for these identifiers. These content identifiers and rules are stored in an ID registry database 914 and rule database 918, respectively. These databases may be integrated in one database or implemented in separate databases with a key or like identifier (e.g., unique identifier) that associates a content object with a corresponding rule governing the metadata response.

The router system enables consumers to request a metadata response wherever the content object travels in its distribution chain as long as the consumer has a reader to extract a content identifier and associated modules for packaging and sending a metadata request to the router system. FIG. 9 illustrates the metadata request as an "ID labeled request" from the consumer domain. The "consumer domain" in this context is not intended to be limited to only retail users of content. Rather, it includes virtually any user of the router system whether they represent content owners or distributors seeking to access metadata for their content, purchasers/licensees of the content, or customers that receive and consumer content for entertainment, information or commerce. In fact, rules help facilitate different levels of access among the various types of consumers of the router system.

The router system includes an ID resolver 920, which receives the ID labeled request and determines an ID for the content object based on the content ID and associated identification system information supplied by the requesting device. The discussion for mapping content identifiers and provider identifiers into a unique identifier for a content object is one example of such a process. This approach of unifying content identification schemes enables the routing system to serve as a form of lingua franca for content identification, stitching together disparate content naming schemes.

The content ID may have one or more metadata responses registered for it. A rules processor 922 executes rules associated with the content object (e.g., via the content ID) to determine the metadata response based on information supplied in the request, information about the requesting user (including the user's device capabilities, connectivity, etc.), and/or information retained in the routing system, such as transaction data for the content object or the class from which it the content object originates (class defined by content genre, by affinity group of consumers for the content genre, etc.).

In addition to resolving IDs and executing rules for content objects, the routing system may also provide additional services. The router system of FIG. 9 includes a traffic monitor 924, which logs usage statistics and generates usage reports. An embodiment of this usage monitoring and reporting is described with reference to CMDS implementations below.

The rules processor can also execute rules based on a content object's dynamic metadata. Dynamic metadata refers to metadata that change over time. One example of such dynamic metadata is a content object's usage data. A rule governing the metadata response can be made dependent on the usage data. For example, if the number of requests for metadata exceed a threshold, the metadata response is adapted accordingly. For example, more metadata data including information about related content and commerce opportunities are provided as the interest level in a particular object increases over time. The response can be tailored based on user information derived from metadata requesters so that the response is tailored to the common attributes of the class of users requesting metadata for the object. Patterns of common attributes of users, content or the content metadata emerge as usage data is tracked over time. This enables the system to identify and dynamically add metadata responses for a content object. For example, as interest in the content object grows, the routing system adds additional links to related content objects and products and services to an affinity group for a content object or class of object. The affinity group can be defined, for example, as a group with common preferences or interests in content objects.

As a further service, the routing system can also act as a metadata repository and aggregator of metadata responses. FIG. 9 includes a response aggregator 926, which provides metadata responses and stores metadata for content objects in support of this function. In some embodiments, the routing system simply re-directs the metadata request to the content owner/distributor, which in turn, provides metadata to the requesting consumer. There are alternative ways to implement this approach. One, as documented in CMDS embodiments, is to return to the consumer a URL or set of URLs for a metadata sources controlled by others. The consumer's device (e.g., via a web browser or like application program) then sends a request for metadata to the metadata repository at this URL. Another approach is to act as a proxy server for the content owner's metadata repository. In this case, the routing system determines the metadata source's URL based on ID resolution and rule execution (if rules exist) and issues a metadata request to the metadata repository at this URL. If multiple URLs are involved, it makes a query to each one. The routing services aggregate the metadata responses from the metadata repositories and returns the aggregated metadata to the requesting consumer. Another approach is where the routing system forwards the metadata request from a consumer to the URL of a metadata repository, which in turn, responds with metadata directly to the requesting consumer. In sum, the content owner/distributor controls the metadata response in some cases as shown in block 930, where as the routing system controls the response in the other case.

As an added function, the routing service acts as a metadata repository. In cases where a rule dictates it, a user requests it or other metadata sources are not available, the routing system identifies the URL of the metadata repository within its control, packages the metadata response with the response aggregator and returns the metadata to the requesting consumer.

The capability of serving as a metadata repository enables the routing system to provide additional network services. One such service is to enable users the ability to collaborate in the creation of metadata for content objects by posting recommendations, preferences, and other related information about content objects in the metadata repository. This adds an added dimension to affinity groups identified and managed by the routing system. In particular, it enables members of these groups to be active contributors to the metadata for the content objects that they are most interested in.

Having described the routing system, we now describe rules implementations in more detail. One approach to supporting multiple different rules for a content object is to enable one or more participants that control the object to register different content IDs associated with that object in the ID registry, each having an associated URL or set of URLs in the registry database. For example, each content ID references a URL for the respective participant (e.g., content owner, distributor, retailer, each providing different metadata sources at the corresponding URLs in the database).

This approach may lead to further rules being implemented in the router system and/or client program executing in the consumer's device. For example, the process begins with a client reader program or programs on the consumer's device extracting multiple CIDs from the content object and forwarding them to the router system. The router system, in turn, looks up the corresponding URL or URL list for each CID. Then, the router executes a rule governing which CID or CIDs have priority and returns a subset of the URLs associated with the CIDs with priority. Alternatively, the router refrains from prioritizing the requests and returns all URLs associated with each content ID to a client reader program in the consumer's device. The client program either displays a web page with hyperlinks to each URL, or it executes rules to select which URL or set of URLs has priority, and then re-directs (e.g., sends a metadata request) to the URL with the highest priority.

A single CID may be associated with metadata responses from several different participants (search engine provider, metadata aggregator, distributor like iTunes, Record Label, advertiser, etc.). In this case, the registrant of the CID specifies the URL or URL list corresponding to each of the metadata responses for that CID. In addition, the registrant specifies a rule governing the conditions in which the different metadata responses are triggered. The registration process is facilitated by a graphical user interface accessible via a network, such as a web interface enabling the registrant to list for each metadata response:

1. the URL or set of URLs for the desired metadata response;

2. the conditions that cause the routing system to select the metadata response.

The conditions are a function of the attributes of the routing transaction. These attributes fall into two categories: user attributes and non-user attributes. The user attributes are obtained by the router through the user registration process, in data provided in the metadata request, and/or in data derived by the router based on history of requests from the user. The user can specify metadata preferences through registration or in the metadata request. Preferences can include likes/dislikes about content genres, likes/dislikes for product/service advertising, preferences in content format, preferences for types of media players and media player settings, device capabilities, etc. Non-user attributes include attributes about the transaction derived by the system, such as the time, geographic territory, history of transactions relating to the content object or content objects in the same genre as the content object, type of object, etc. For example, the router's usage data provides information about the popularity of the content object, correlation to the preferences of others who have requested metadata for the object, etc. In some applications, the reader packages information about the object along with the extracted content ID, such as the object type and format. This enables the metadata response to be tailored to the object type and format that the user has the capability to render on his or her device.

A typical rule registration interface enables the registrant to select different URLs depending on the attributes of the routing transaction. For example, rule 1 dictates: use URL 1 when artist preference=TRUE; Account status=active subscriber; and Advertising Tolerance=LOW.

Rule processors can be implemented within and executed within one or more different locations along the metadata request and response paths. Before enumerating these locations, let's review a summary of the locations in a CMDS embodiment. The first location is the requesting client, which is within the consumer domain shown in FIG. 9. The next is the router system, which itself, has different components that can contribute to rule processing. For simplicity, FIG. 9 shows the rule processor as a single block, yet the rules processing function may be distributed. The next location along the path is either back to the requesting client, or to metadata source to which the request has been re-directed by the router.

At content identification and metadata request, rules are executed to control:

1. what type of CID the client extracts (is client going to trigger fingerprint based CID retrieval, DWM CID retrieval or header/footer CID retrieval?)

2. what client sends to the router (one or multiple CIDs)

At the router, the rules processor executes a rule or rules to control:

1. Which CIDs, if multiple CIDs for one content object are provided, has priority?

2. Which URLs the router returns to client (e.g., single/multiple URL per each CID, or does one CID dominate?)

3. Whether the registrant of a content object has requested that the request be re-directed to a URL of a device it controls, which in turn, provides a metadata response to the client.

At the client, upon response from the router or other device per above, the rules are executed to control:

1. what client displays (are URLs prioritized or not?)

2. what client sends to web server in response to packet returned by router.

At the client, a client program used to consume or manage content is equipped with a reader for one or a few types of content IDs. This client controls what IDs get sent to the router and thus, controls which entities are linked to.

Alternatively, there are multiple readers, each acting independently according to their own rules.

Alternatively, the router sends all URLs for metadata sources associated with corresponding CIDs back to the client and the client decides which one to use. The client may also determine what type of context data it provides to the metadata source, such as GPS information, depending on whether the user wants to get or has paid for location based services.

To respect user privacy, user preferences can be maintained solely at the client. The client maintains control over whether and when the user preferences and attributes are forwarded to the router and/or metadata source/repository. In some cases, they are not provided at all, and the client aggregates and then tailors the metadata response from multiple URLs based on user preferences. In other cases, the client forwards the preferences to the metadata source directly after receiving its URL to the router. In this case, the router does not get access to the user preferences.

At the router, the router determines based on context or other information from the client how to re-direct the client to a metadata source located at a URL.

The metadata source at the URL sends different types of metadata or links to a requesting client, which enables the client to pick or the user to pick from among metadata/links presented in a user interface of the client.

As noted above, the metadata responses may be prioritized based on user preferences. In such embodiment, the client is programmed to get or learn user preferences and prioritizes links to metadata returned by the system accordingly.

In another embodiment, the router system provides additional services for managing users, including, for example, authenticating users and managing user accounts. This can be explicit management of information supplied by the user, or management of user transactions based on consent provided by the user. In either case, the router derives a user classification based on information it has gathered about the user's preferences for consuming content. In one embodiment, the router system classifies routing transactions based on the user's willingness to pay for products and services. Those willing to pay for premium content get a metadata response with opportunities to access this premium content, while those not willing to pay get no fee metadata responses that are subsidized by advertising, for example. Further, if the router has authenticated the user and the user's account status, it re-directs the user to URLs that are secure electronic commerce sites, initialized based on the user's identity. This enables the routing system to link the user directly to electronic transactions without requiring the metadata source to handle the authentication processing.

One particular example of the authentication service in the router is to enable direct linking into a Digital Rights Management (DRM) server or other e-commerce server, in a state where the client is pre-authenticated. The client and router provide authentication information needed to complete an electronic purchase through private and/or encrypted data fields, or a combination of public and private fields, where private only readable by certain entities.

Another service of the router is track the flow of content object sharing over networks. Digital certificates, or other identifying information of users, are used to detect different users that request metadata for a particular content object, which is uniquely identified via content identifier. This tracking of content object flow by content ID and user certificates provides data to the content owner regarding how content objects flow through networks of users. This provides another means to identify an affinity group for content and tailor content and metadata distribution to the preferences of the affinity group. This tracing method traces content objects as they are processed by new and different users. Each time a request for metadata is received, the router logs the request and also records user identification for the request, if available. The router analyzes this log to identify the path of the content object through new users.

As demonstrated in the example above, the router enables metadata responses to be governed by a hierarchy of rules distributed across the system, including macro rules implemented in the router that specify URLs to return, and micro rules implemented in the client that further control how the client presents and links to these URLs.

Examples of micro rules include: rules governing how authentication of a user occurs to enable access to different type of metadata sources, (e.g., use of identity triangle—what user knows—password, has—access token, ID card, and is: biometric login and user verification). The level of authentication dictates the nature of the metadata provided (what links, metadata, etc. are provided). The level of authentication also dictates purchase limits and usage rights (rights for redistribution or sharing with other users).

An additional service of the router system is the support for handling private and public fields in the data packets sent as metadata requests to the router. For example, the client device in the consumer domain sends public and private fields (public field is generally readable, private field is packaged by client and likely encrypted, intended to be read only by authorized service, such as secure transaction server that the router links to). The router uses the public field, for example, as data input for rules determining the URLs for the metadata responses. The metadata sources decrypt and use the data in the private fields to provide tailored information to the user, while keeping the user's information private and secure.

The rules in some systems also govern the amount of network resources allocated for a metadata transaction. In particular, the size of the socket, data pipe or channel opened between the metadata source and the client is a function of client's authentication level and user account status (e.g., indicating willingness and ability to pay).

There are a number of ways to propagate rules through the network infrastructure. In one embodiment, rules are pushed to client through content auxiliary channels in the content objects (such as file header/footer, encryption container, digital watermark, etc.) In another embodiment, rules are distributed with media consumption programs, such as media players, like Windows Media from Microsoft Corporation and iTunes from Apple Computer, etc.

Each component (client, router, and metadata source) executes its own set of rules established based on what it has learned about the user.

As noted above, the input to the rules includes user and non-user attributes, including, but not limited to user demographics, device platform, age, geography (GPS), time, search engine metrics that prioritize results for content searches based on the user's search history, which indicates preferences for types of content.

The input to the rules includes preferences derived from user behavior, content consumption history, most frequently accessed content, etc.

Another input includes content type, which enables the content to by targeted at content type preferences of the user or the user's rendering equipment. Also, the rules specify different metadata responses based on whether the client device is operating in on line or off line mode. Offline mode instructs the client to re-direct a metadata request to a metadata source in its cache of metadata, which serves as a local metadata repository.

The router system provides a number of opportunities for revenue generating data services. One such service is revenue sharing model in which fees collected for distributing metadata are shared with content owners as a function of usage data. In an embodiment of this service, the router tracks usage data corresponding to metadata requests for content objects and the usage data for these content objects is used to determine revenue sharing among content owners and distributors. The router tracks usage data and this usage data is used to determine how artists that created the content get a share of fee collected under a license in which collected fees distributed to the artists based on metrics dependent on the distribution of metadata requests for the content objects. Additional models of revenue sharing are fee based, where a portion of the fees paid by consumers for metadata responses are distributed to the content owners.

Another service of the router is an auditing function. One such audit is checking the validity of URLs supplied to it during registration. The router periodically checks URLs in its database to make sure they are current, valid, responsive, etc. The router also provides metadata request trend analysis that enables the metadata sources to anticipate metadata request work load and allocate more resources to serve metadata based on the anticipated workload.

The router itself is distributed and has instances of itself that are mirrored across the network. The router specifies to the clients which among several URLs to use for subsequent request for routing services.

Another service of the router is to track the form of content identification used to identify the content object for each transaction. This enables the router to flag content for subsequent content labeling, including layers of different content IDs. For example, a content object identified using a fingerprint is flagged for embedding a digital watermark. The digital watermark provides a finer grain identification than the fingerprint by differentiating among copies of the same content. The content ID in the watermark is then registered and associated with metadata responses that are tailored to a particular copy of the content object.

More on User Generated Metadata and Rules

Above, we described how to incorporate user generated metadata into the metadata routing system. The routing system has the flexibility to incorporate its own metadata repository for user created metadata, to link to user generated metadata repositories maintained by others, and to integrate a combination of both types of metadata sources. By establishing an interface that allows metadata providers to register links between content and metadata sources, the routing system has the flexibility to integrate different metadata sources into one unified metadata service. For example, the routing system maintains links between the identifier (or identifiers) for a piece of content (e.g., song, TV or radio program, movie, Podcast, advertisement, etc.) and sources of metadata, including user generated metadata within or outside the routing system's domain. The database, in particular, stores the unique identifier of the piece of content and associated URLs of the user generated metadata for that piece of content.

In particular, the routing system can specifically link to the user generated metadata maintained in different user generated metadata sites on the Internet. Examples of web sites that have implemented systems for user generated metadata include Flickr and Del.icio.us, which provide web services operated by Yahoo. These systems enable users to apply metadata, called "tags," to pieces of content. In particular, Flickr allows users to upload images and add tags to images within the context of the Fickr system. However, the tags are not persistently linked to content, and therefore, as content moves outside the bounds of the Flickr system (e.g., the Flickr servers or connected client device), the tags are easily lost. The routing system provides a means for persistently maintaining links between a content object and its metadata, even as the object is distributed across different domains, devices and networks. Further, it allows a content object to be persistently linked to several different user generated metadata sites.

When these capabilities of persistent linking across different sources of metadata are combined with rules based processing, the system fulfills a more sophisticated array of metadata requests across a broad array of metadata sources. Each piece of content becomes its own node or portal interconnected with disparate sources of metadata across heterogeneous distribution methods, networks, content formats, and devices. In addition, rules processing in the system filters metadata according to user preferences.

It is anticipated that in many applications, users will prefer user-community generated metadata over the original metadata from the content owner or distributor. An example is user generated metadata that assigns content ratings to content for parental control. In particular, a user may trust the content rating applied by the trusted community of which he or she is a member over the rating applied by an industry group. Today, as long as the user stays within the domain of a provider of trusted content (e.g., within a connected session to a web service), the user can take advantage of the metadata associated with the content in that domain. However, when content travels outside the domain (e.g., is stored in a device that does not respect or even understand the protocol or metadata from the domain, goes offline, is trans-coded or played, is emailed to a friend), then a scheme is needed to re-associate metadata and apply the user's preferences. The routing system supports this re-association and enforcement of user preferences by allowing the user to request metadata with the user's rules that specify that, in certain contexts, the content rating in the metadata from the user group is to be used instead of the industry content rating.

A typical usage scenario of the system to apply ratings is as follows: user encounters an content (in any of a myriad of ways: e.g., receives from a friend, downloads from a social networking site, records from a live broadcast, searches an archive); the user's device includes an application that incorporates the reader, which extracts a content ID from the content (or alternatively, the user selects the content, which triggers transmission of it to a remote reader that does the same); the reader forwards the content ID along with user preferences to the routing system, the routing system extracts the related metadata from linked sites specified by the associated URLs, the routing system applies the rules applicable to the content, including those based on user preferences, and sends back a metadata response to the user that informs the user of the rating and/or the reader automatically enforces the rating by controlling play out of the content.

These metadata sources, as noted, can be dynamic metadata sources based on dynamically generated metadata from searches, RSS feeds, and mash-ups. The URLs identify more than just IP addresses of physical devices, and extend to dynamic metadata sources in virtual environments such as Second Like (URL in protocol for Second Life adheres to SLTP protocol).

Federated Content Identity

The concept of federated identity has emerged in response to demands for a user-friendly and interoperable frame work for establishing user identity across disparate domains (e.g., across the security walls erected around different entities' databases, such as the metadata services of a content distributor, content owner, social networking site, metadata tagging sites like Flickr and del.icio.us). Simply stated from the user perspective, "federated identity" is an identity management framework that enables the user to access disparate data services, each with their unique secure log in procedures, with a single log in. As described below, embodiments of the routing system leverage federated identify technologies, such as SAML and WS-Trust, to establish and enforce user identity for users of the routing system, including both providers and consumers of metadata.

The disparity of content identification and metadata protocols creates a similar demand for a scheme of federated content identity. The routing system satisfies demand by creating a framework that unifies disparate content identification technologies (such as digital watermarking, content fingerprinting, headers in files whether un-encrypted or part of an encryption container) as well as incompatible protocols for content identifiers. Further, it unifies disparate sources of metadata, as well as different metadata formats. In short, it provides cross-platform content identity and metadata services. A typical usage example to leverage these capabilities is as follows: a user wishes to find all metadata relating to a particular concert tour associated with a particular song; the user submits the user preference "concert tour" and "year=2005") for the song; the reader extracts one or more content identifiers from the song, packages them with the user preferences, and sends a request to the routing system; the routing system establishes a federated content identity for the song knowing the ID providers from the reader and the content IDs; the routing system uses this content identity to find linked sources of metadata in its database (e.g., gets the URLs of these metadata sources); the routing system aggregates the metadata responses from these URLs from different domains; the routing system applies the user's preferences and returns a metadata responses that relate to concert tour and the year 2005 to the user. The user need not concern herself with the details of identifying the content or gaining access to disparate metadata sources.

Public Interfaces for the Metadata System, Mash Ups for Metadata and Metadata Usage Statistics The routing system establishes an interoperable system for associating content with metadata across disparate content identification and metadata systems. In so doing, it also provides a mechanism for monitoring consumption of content and metadata across disparate domains of content origin and consumption. The support for user generated metadata further enables new sources of metadata which users will likely value as much or more than the content itself. This is particularly true for a system that analyzes metadata usage and content usage and makes information available as additional metadata linked to the content because it facilitates the user's ability to search for content that is of particular interest to him. One of the must compelling types of metadata is the metadata that identifies content by its popularity within certain groups (e.g., popularity as defined by tastemakers, affinity groups, niche genres for content, etc.).

In view of this important function of identifying compelling metadata, there is a commensurate value in an interface that efficiently unlocks this value by establishing programmatic access to the metadata and metadata statistics. Within a single system for metadata generation, programmatic interfaces are provided for that particular system. However, an embodiment of the routing system described in this document provides a programmatic interface across heterogeneous content identification technologies and metadata sources, and further, provides a programmatic interface to the metadata usage data that is collected across these heterogeneous metadata sources and linked back to individual content items through a variety of content identification technologies.

Examples of programmable interface technology that the routing system leverages include mash-ups built on Web 2.0, Programmable web, and semantic web programming constructs and Application Programming Interfaces (APIs). The implementer can use these technologies to build the metadata response aggregator, traffic monitor, and rule processor detailed above, as well as to build their own versions of these modules on top of the routing system. For example, the system can be embodied in a hierarchy of mash-ups, each providing additional functionality on top of the APIs of other mash-ups of metadata services provided by the system. The routing system, by providing a mechanism of linking metadata sources to content identifiers, creates a Content Object Name Service (think of it as a Domain Name Service for content items). Further, the response aggregator, rule process or and traffic monitor build on top of this service, which as noted, can each be implemented as mash-ups of the routing system. When these metadata services are constructed in this form of interconnected mash-ups, the routing system provides a form of DNS for content metadata mash-ups.

Measuring Metadata Popularity and Tastemaker Identification

The tracking of content and metadata consumption in the system and subsequent publishing of this data to the user community enables user's to more effectively identify metadata that matches there preferences. It also provides an opportunity for content owners to analyze these preferences and re-package content with popular user generated metadata. Content owners can also identify unique affinity groups and tailor new releases to the preferences of these groups. As noted above, the system tracks several forms of usage data. These types of usage data include monitoring traffic of content objects (e.g., tracking object distribution), traffic of metadata requests (e.g., number of requests for particular metadata, or metadata from a particular source), and user preferences and rules processing (e.g., user preferences derived from metadata analysis, such as the affinity group analysis). With the support for dynamic metadata (metadata generated over time as an object is consumed) and the means to measure popularity of metadata and its providers, the system identifies high value metadata which provides an opportunity for content object owners and advertisers to package this popular metadata and monetize it (sell it or sell advertising presented with its consumption by users).

The system also is able to capture a historical archive of metadata generation and consumption data, which further allows content and metadata distribution to be analyzed to identify transient metadata captured from points in time to be packaged and monetized in a similar fashion. For example, dynamic metadata can be packaged with the content objects that caused its generation and distributed. Examples in include content packaged by tastes of an affinity group of users, a period of time, a geographic market, etc.

CMDS Example Implementation Summary

The Content Metadata Directory Services (CMDS) provides a global trusted directory service that connects consumers of identified content to content-provider authorized and managed metadata databases and other digital resources.

It solves the problems created by the fact that digital distribution separates content from packaging, new 1-1 marketing opportunities are not being optimally utilized for content distribution, and digital distribution is moving forward with proprietary channels that make the value chain more complex rather than simpler. The CMDS system provides all existing value chain participants an environment to agree upon metadata usage and manage their proprietary metadata, as opposed to being another proprietary metadata repository. It also provides cross-sell/up-sell e-commerce opportunities. The CMDS system is interoperable with all content identifiers, PC and mobile devices, and enables usage reporting with vital marketing statistics.

The CMDS system standardizes three components (1) Registration Interface, (2) Resolution Interface and (3) Router Requirements. The interfaces are specified in terms of XML-based Web Services, an existing industry standard, for simplicity and interoperability. The router requirements guarantee that the system functions properly and maximizes value to vendors and users. These minimal specs create a system that is simple for vendors and users to interact with, while providing extremely flexible workflow and architecture. For example, CMDS can either (1) create unique content identifiers (CIDs) that can be embedded with any technology, such as digital watermarks (DWM) or signed headers, or (2) utilize CIDs created by pre-existing systems such as content fingerprints (a.k.a. robust hashes), Electronic Product Codes (EPC), IFPI's Grid, and URI. Furthermore, users can learn more about artists, similar content and related items, and purchase content and related items.

The CMDS system provides users with valuable information and simple purchase options, and helps content owners and retailers increase ROI by expanding their knowledge of content usage and making it easier for consumers to buy content and related items.

CMDS Implementation Definitions

The terms used in the following sections are defined here, in alphabetical order.

| Term | Description |
| --- | --- |
| Central Database | A global, master Database (where Database defined below). |
| Central Handler | A global, master Handler (where Handler is defined below). |
| Central Router | A global, master Router (where Router is defined below). |
| Content ID (CID) | A unique content identifier. It is different for different pieces of content, and can be unique for different copies of the same content. The combination of the CID with ID Provider ID and ID Version is globally unique. These additional fields allow ID Providers to embed and detect a smaller namespace (i.e. fewer bits) and the system to work with all pre-existing ID systems. However, these additional fields also require slightly more complexity in the Router. |
| Content Metadata Directory Services (CMDS) | A system for Content Providers to register Content IDs and URLs, and Users to resolve Content IDs into URLs to obtain more information about the content where the Content Providers manage their proprietary metadata. |
| Content Provider | The provider of the content, such as the content owner and retailer, or any company with rights to distribute content and/or content metadata. |
| Database | The second component of a Router which is used to store the Content Provider's links to their proprietary metadata, and store vendors' or users' contact information.<br>Note: Often the term is used in the plural because it can refer to several linked databases. |

| Term | Description |
| --- | --- |
| Digital Watermark (DWM) | Data embedded within the content that does not degrade the content's quality to end-users, but is reliably detectable by enabled hardware or software. |
| EPC | Electronic Product Code as specified by EPCGlobal. |
| Fingerprint | A fingerprint identifies content from features of the content. It is also known as a robust hash or content based identification (and should not be confused with a forensic DWM). |
| Handler | The first component of a Router which handles the registration or resolution requests and responses.<br>Note: Often the term is used in the plural because it can refer to several linked handlers. |
| ID Provider | The company that provides the technology to identify the content and interface with a Router. |
| ID Provider ID | The unique ID assigned to the ID Provider. An ID rather than name is used so that the combination of ID Provider ID, ID Version and CID is a globally unique number (when the CID is a number, such as when created by this system), and numbers are faster to lookup in a Database. (If the CID is pre-existing, such as URI, it may be formatted as text.) |
| ID Version | The ID version provides the version of the CID algorithm. It enables the ID Provider to re-use the same IDs in different version of their algorithms, such as for different content types, as well as to use various ID formats. The ID Version is different for each algorithm that uses overlapping CIDs for an ID Provider. |
| Mirror Database | An exact duplicate of the Central Database. |
| Mirror Handler | An exact duplicate of the Central Handler. |
| Mirror Router | An exact duplicate of the Central Router. |
| Resolution Request Message | The interface defining the message sent to a Router to request URLs (or other information). |
| Resolution Response Message | The interface defining the message sent from a Router in response to a resolution request. |
| Registration Authority | The manager of the CMDS system. For a public system, as used in B2C environments, the Registration Authority is a trusted $3^{rd}$ party vendor. There is one public Registration Authority. For a private system, as used in B2B environments, the Registration Authority is usually the private system provider. There may be numerous private Registration Authorities. |
| Registration Request Message | The interface defining the message sent to a Router to request registration of CIDs, URLs, vendors or users. |
| Registration Response Message | The interface defining the message sent from a Router in response to a registration request. |
| Request Code | A key part of the registration or resolution request message that describes the desired action for the message. |
| Router | The backend system that handles registration and resolution. It includes two main components, a Handler and Database.<br>Note: Often the term is used in the plural because it can refer to several linked routers. |
| User | The end user of the system. For example, it may be a consumer linking to more information via their PC Multimedia jukebox, or a movie critic linking to current marketing materials via a closed, private system. |

CMDS Background

The Content Metadata Directory Services (CMDS) system is needed since content identification technology cannot provide useful information without accessing a backend system that links the ID to relevant information (a.k.a. metadata). It is a router-based system, which is beneficial to a central metadata repository, so that content providers can manage their proprietary information and content can be routed to this information from any location.

CMDS provides a global trusted metadata directory service that connects consumers of identified content with authenticated "origin of source" databases and other content-provider authorized digital resources.

CMDS enables content owners to:

Leverage in-house digital asset management system

Gain from economies of scale

Act as the content authority over their own digital assets; and

Address digital distribution issues from a single, unified approach, rather than a fragmented approach.

Cross-sell/up-sell

CMDS also provides consumers metadata and e-commerce opportunities

Focused on routing

Content Providers manage their proprietary information

Enable eCommerce for all value chain participants e.g. Both content owners and retailers can embed CIDs Interoperability with all content identity provider technology Compatible with both PC and mobile devices Interoperability for multiple ID Providers whom license a common algorithm Enable usage reporting and vital marketing statistics CMDS System Embodiment Overview A content identification system has five main components: registration, embedding/calculating, reading, resolution, and a router, as shown in FIG. 4. These components can be grouped into content identification and content routing (e.g., CMDS) categories. The content identification components include embedding content identification (or calculating it for fingerprinting) and reading content identification (a.k.a. detection). The content owner usually handles the embedding and the consumer product usually handles the reading.

The CMDS components include:

1. Registration Interface
2. Resolution Interface
3. A Router

These three components are standardized in the companion specification such that any content identification technology can interoperate. The example implementation is also optimized for both technologies, such as DWM, where the fewer bits in the identifier the better, and for technologies, such as URI, which have non-integer namespaces. The example implementation has the flexibility to be optimized for a PC or mobile environment (or any future hybrid environment).

In FIG. 4, the content is labeled Protected and Identified Content since it is identified when distributed due to this process, and may also be protected by other means. Although the focus of this example implementation is using identification to enhance content, the identification may also be used for protecting the content and/or other technology may be used to protect the content. When the identification is used to both enhance and protect the content, there are mutual benefits, such as pirated content that doesn't have the identification does not provide the enhance features to the user. In other words, this implementation is not a replacement for content protection, but synergistic with it.

A Registration Authority handles these three content routing components. For a public system, as used in B2C environments, the Registration Authority is a trusted $3^{rd}$ party vendor. There is one public Registration Authority. For a private system, as used in B2B environments, the Registration Authority is usually the private system provider (and usually the only ID Provider). There may be numerous private Registration Authorities, and each system most likely interact with another system in this B2B environment.

This system's design allows the Content Providers (including content owners, such as Record Labels, Movie Studios and Stock Photo Agencies, and retailers, such as Apple iTunes, Napster, WalMart, Hollywood Video, etc.) to interact directly with the user, such as a consumer, as shown in FIG. 5. This enables the Content Providers to manage their own proprietary data. In other words, the usage model is the user interacts with a router, which redirects the user to the Content Provider for metadata and e-commerce opportunities.

Thus, the system routes requests for metadata to Content Providers, such as content owners and retailers. In other words, the Router includes a Database that mainly contains CIDs and URLs that link to metadata and e-commerce opportunities, which are stored by the Content Provider, not at the Router.

The system has a distributed architecture, as shown in FIG. 7. At this time, only the duplicates of the Central Router (labeled Mirror Routers) are specified. These Routers can have separate Registration and Resolution Routers. There will most likely be more Resolution Routers since there will be more resolution requests. In the future, Cached Routers will interact with the Mirror Resolution Routers and only save recent resolution requests for efficient responses. Cached Routers are not applicable to registration requests since these requests occur neither often nor repetitively and are immediately forwarded to the Central Router. The example implementation requires the reader to periodically request the address of the Router that it should be utilizing for registration and resolution; thus, the system can dynamically change configuration. It is unnecessary for the Central Router and Mirror Routers to request addresses, as they are all run by the Registration Authority and, thus, know each other's addresses.

A Router consists of a Handler and Database. A Handler accepts the registration and resolution requests, quickly obtains the required information and sends the registration and resolution responses. It may be a single software thread running on the same machine as the database, such as for a local low-quantity implementation, or it may quickly hand-off requests by request code or ID Provider (as both fields are in the XML message header) to various request handlers that are linked to a local request Databases across multiple CPUs, as shown in FIG. 6.

Workflow Example

An exemplar workflow demonstrating content owners and retailer registering contact information and content, and consumers linking to metadata and purchasing content is shown in Table 1. The example assumes that the ID Provider and two Content Providers, a content owner and retailer, have received their respective identification and passwords from the Registration Authority. It also assumes that ID Providers have registered contact information (via UpdateIDProvider request code), and distributed embedder and reader software. The request codes are shown in italics between the arrows for messages sent to the router.

TABLE 1

| Workflow Example | | |
|---|---|---|
| Content Provider | Router | User |
| 1. Content owner registers initial contact information →UpdateContentProvider→ | | |
| 2. Content owner notified of success ← | | |
| 3. Content owner creates a CID →CreateCID→ | | |
| 4. Content owner receives CID ← | | |
| 5. Content owner registers Primary URL →RegURL→ | | |
| 6. Content owner notified of success ← | | |
| 7. Content owner registers additional URLs →RegURLs→ | | |
| 8. Content owner notified of success ← | | |
| 9. Retailer registers initial contact information →UpdateContentProvider→ | | |

TABLE 1-continued

Workflow Example

| Content Provider | Router | User |
|---|---|---|
| 10. Retailer notified of success ← | | |
| 11. Retailer registers a pre-existing CID →RegCID→ | | |
| 12. Retailer notified of success ← | | |
| 13. Retailer registers Primary URL →RegURL→ | | |
| 14. Retailer notified of success ← | | |
| | | 15. Consumer A listens to his PC Jukebox and clicks on the "more info" button based upon the URI in the audio content ←ResURLs← |
| | 16. Router provides consumer with URLs from content owner and retailer, some of which create dynamic web pages → | |
| | | 16(a). Consumer A learns more about the content and later purchases a CD by the same artist at the store. |
| | | 17. Consumer B decides to register to win a hybrid car ←RegUser← |
| | 18. Consumer B is notified of success → | |
| | | 19. Consumer B uses cell phone to learn more about a film via taking a picture of an ad and reading a DWM ←ResURLs← |
| | 20. Router forwards URLs to consumer B's cell phone. Since the user is registered, the URLs includes lists of local theatres playing the movie and favorite local stores selling the DVD → | |
| | | 20(a). The consumer buys the DVD from a local store! |

Architecture Example

The architecture is flexible since the specification defines an extensible messaging interface and router design.

An example architecture which enables both content owners and retailers to use the system is shown in FIG. 8. Many other architectures or expansion of this architecture are possible, but this architecture is expected to be the most used architecture. This architecture enables the workflow discussed in the previous section, as well as many other workflows. The architecture includes:

- Content owner environment with embedding/calculating software that has a registration interface to embed identification in the content (or store its fingerprint)
- Retailer environment with embedding/calculating software that has a registration interface to embed or add identification to the content (or store its fingerprint)
- A Router consisting of a Central Handler, Central Database, Mirror Handlers and Mirror Databases
- Protected and identified content in cyberspace
- User Environment with reader software that has a resolution interface to link the user to more information, as well as a registration interface to register the user, if the user opts-in to send secondary personal information

Usage Scenario Examples

These usage scenarios help demonstrate the flexibility and capabilities of the specification. They also discuss what technically happens in the background (with request codes and other XML tags in parenthesis)—all in italics since they are technical details.

Consumer Linked to Metadata and eCommerce

This usage scenario includes most aspects of registrations for ID Providers, Content Providers, e.g. content owners and retailers, and Users, as well as Users, e.g. consumers, linking to metadata and eCommerce. It demonstrates several key aspects of the system, and is most similar to the workflow example in Table 1.

ID Provider Registration

The first step is registration of at least one ID provider. The ID provider receives an ID and password from the Registration Authority via a secured process, such as a mailed letter or telephone call and company and contact person security check. Next, the ID provider securely registers their contact information with the registration authority, either through the Registration Authority's software (via UpdateIDProvider) or through an interactive secure web page. The ID Provider is notified of success or any errors.

In the background, the ID Provider embedder and detector software contains the ID Provider ID, and submits it, along with an ID Version of the embedding or detection algorithm, with every request.

Content Owner Registers as Content Provider

The second step is registration of a content owner. The content owner receives a Content Provider name and password from the Registration Authority via a secured process, such as a mailed letter or telephone call and company and contact person security check. Then, the content owner uses their embedder or related software received from the ID Provider to securely register contact information (via UpdateContentProvider). The embedder software verifies the response, and notifies the content owner of success or any errors.

Alternatively, the content provider could have used the Registration Authorities secure web site to interactively register their contact information.

Content Owner Registers New Content

Once the Content Owner has registered, they securely register their content. First, they use the embedder or related software to obtain a unique Content ID (via CreateCID). Afterwards, the Content Provider registers two primary URLs, one for PCs and one for mobile devices (via URLType XML tag with Full or WAP data entry), as well as four additional URLs, two for PC and two for mobile, (via six calls with RegURL request code). For example, for both PCs and mobile devices, the primary URL provide static information about the movie Fantasia from Disney, one additional URL provides information about songs in Fantasia, and the other additional URL provides items for sale regarding Fantasia from Amazon.com, using a dynamic web page via a URL including search terms based upon the CID. The software application verifies the response for success and let the content owner know about the success (or any errors).

In one alternative, the content owner could enter multiple URLs in the software's GUI with checkboxes for fully functional or WAP. In the background of this configuration, the software uses the request grouping method to obtain the CID (via CreateCID), register the primary URLs (via two calls with RegURL), and additional URLs (via two calls with RegURLs). The Routers handle the timing such that the CID is registered before the URLs.

In another alternative, the content owner can use the Registration Authorities secure web site, and interactively register the URLs, one-by-one.

Retailer Registers as Content Provider and Registers Content

A retailer, assuming they have worked out rights with the content owner, can also securely register as a Content Provider with the Registration Authority, obtain a Content Provider name and password, and register contact information (via UpdateContentProvider). For example, the retailer could be Apple iTunes store. Then, when the retailer prepares to sell content, they request a CID (via CreateCID) and add two URLs, one primary URL to sell songs by the same artist (via RegURL), and one additional URL to sell similar songs (via RegURLs).

Anonymous User Linking

When a user receives a copy of the content with the registered CIDs, the user can request and receive more information from their multimedia player. Preferably, the multimedia player includes a reader plug-in that always scans for CIDs, checks that URLs are registered for this CID, and displays a symbol or "more info by <company name>" icon to let the user know that the content is enhanced. This scanning process also makes the response time immediate since CID detection has already been performed.

When the user selects to receive more information, the user receives five web links with brief descriptions. There are three links from the content owner: one with the film history, one with related song information, one with items for sale regarding Fantasia from Amazon.com. There are two links from the retailer whom sold them the movie: one where they can buy songs by the same artist, and one where they can purchase similar content. The user can click on the links to visit the displayed web sites.

In the background, the reader software requests the URLs (via ResURLs) with a group containing two requests, one for the content owner's CID and one for the retailer's CID. As the last step, the reader software parsed the returned URLs and displayed them to the user.

If the CIDs are embedded by two different ID Provider technologies, the user will see two different "more info" buttons, e.g. one "more info from Disney" and one "more info from Apple iTunes Store" and the depending upon the user's selection, the corresponding request is sent and response is displayed.

Mobile User

When a cell phone user identifies content, he/she links to the WAP or WMI version of the registered URLs, assuming the Content Provider registered such URL types (via XML Tag URLType with WAP or WMI data during registration or resolution). Information, formatted for their small screen, is displayed. In addition, preferably, the user can select the display of only a primary link (for content owner or retailer) so that the Content Provider's information is displayed immediately after selecting to receive more information (without the user having to select again from a list of URLs and descriptions since they may be driving).

For example, when the cell phone user hears a song that they like on the radio, they can identify the song (via a DWM or fingerprint) and link to more information. Similarly, the mobile user can identify songs they are listening to on their PDA phone and link to more information.

User Registration

Another user decides to register personal information to obtain a chance to win a new hybrid car. They register from the reader plug-in for their multimedia player (via RegUser). The software application verifies the response for success and lets the user know about the success (or any errors). The user can update their information at any time (via Update User), or decide to opt-out for one specific link or all future links.

Registered User Linking

When this registered user requests more information about the video from the reader plug-in software (via ResURLs), the same five links as displayed for the anonymous user are displayed, as well as links to additional theatres in the user's zip code that are playing Fantasia or similar movies, as well as stores in the user's zip code that carry the related merchandise. In addition, if the Content Provider (e.g. content owner or retailer) maintain information for each username, they can suggest other items based upon the user's previous purchases, or produce a "instant chat" icon if this is a preferred customer who has purchases several things in the past (equivalent to nicely dressed shopper or frequent shopper card holders getting better service in the physical store). Someday this user believes they will be one-click away from purchasing any of the listed items, when all stores share the same secure user information.

Content Provider and ID Provider Reports and Billing

At the end of the month (or any other time), the Content Provider (e.g. content owner or retailer) logs onto the Registration Authorities web page and securely views usage data for each of their registered CIDs. They see that their new movie is hot in the northeast part of the USA and Canada, especially by 8-to-10 year olds around 7 PM EST. They also see that its usage has been starting to decline, and represents 20% of their current resolution usage for this age group, indicating that it is time to release a new movie with this target audience. Finally, they can see their costs and billing options, such as automatic withdrawal at fixed amounts or monthly billing.

The ID Provider can also log onto the same web site and view aggregate usage data for all of the CIDs registered using their technology. However, they cannot view stats by individual CIDs since that is owned by the Content Provider.

In the background, each Router is saving log files for each hit, and, preferably, daily processing the log files to aggregate usage data to provide real-time interaction with these stats, as well as automatic capabilities to email reports to the Content Provider and ID Provider.

Fingerprints/Robust Hashes Link Content to URLs

When using fingerprints to identify content, the fingerprint is calculated from the content and entered into a database. Then, when trying to identify content, the fingerprint is calculated, and matched to the closest fingerprint in the database that also falls within a certain threshold of certainty. The fingerprint is usually a collection of sub-fingerprints, especially when content is streaming. As such, the fingerprint is not a unique content ID, but the fingerprint database links the fingerprint (i.e. collection of sub-fingerprints) to a unique content ID.

Content Provider Registration

The Content Provider can either (i) utilize the fingerprint provider's proprietary content ID system and register pre-existing CIDs with a Router (via RegCID), or (ii) request a unique CID (via CreateCID) and use it in the fingerprint database. Then, the Content Provider can register URLs to link to the CID (via RegURL and RegURLs).

In case (i), CID uniqueness is guaranteed since the fingerprint database guarantees the CID is unique in that database, and the combination of the CID with ID Provider ID and ID Version guarantee global uniqueness. In case (ii), the CID is guaranteed to be unique by the Central Router, and the same combination is globally unique. The ID Version is uniquely defined for each fingerprint algorithm and related database for each ID Provider.

Linking Users to Metadata with Fingerprints

The user selects to receive more information as with any CID and receives URLs and short descriptions (via ResURLs). The user then clicks on the URL with the information that he/she wants to receive.

In the background, when a user requests to receive more information for content identified with fingerprint, the fingerprint reader calculates the fingerprint, sends it to the fingerprint server (either running on the fingerprint provider's server or on the Central Router), the fingerprint server determines the CID from the fingerprint database, returns the CID to the reader, and the reader uses the CID to request the URLs (via ResURLs) from the Router. The Router, having access to the IDProviderID, ID Version and CID data in the resolution request message, uses this globally unique combination to lookup the correct URLs. The proper ID Version is known by the reader since it used that version of the algorithm to determine the CID.

Linking Via Other ID Systems, Such as EPC

In some cases, a different Registration Authority will have previously provided a unique identity, possibly for other purposes, and it is optimal to be able to use this unique content ID in this system. For example, the Electronic Product Code (EPC) provides unique IDs with radiofrequency identifiers (RFIDs). Similarly, IFPI's GRid provides unique content IDs. Or, 4C provides unique IDs with Verance's DWM. Furthermore, an ID Provider could generate their own unique ID, such as using the "album:artist:song" combination from ID3 tags.

An example 96 bit EPC format, also known as general identifier (GID-96) is:

Header: 8 bits
Manufacturer: 28 bits or 268 million unique IDs
Product (SKU): 24 bits or 16 million unique IDs
Serial Number: 36 bits or 68 billion unique IDs As the goal of CMDS is to link users' to information managed by content owners and identified by multiple ID technology providers, whereas the goal of EPCNet involves tracking items through the distribution process for each participant, the backend structures are different. Thus, these two networks can work synergistically, such as with the EPCNet IS having an interface to a CMDS Router. An example of using EPC, such as a film poster ad containing an RFID with EPC GID-96 format, is described below.

Register URLs for Pre-Existing CID

The first step is that the Content Provider registers the pre-existing CID (via RegCID). Then, the Content Provider registers a primary Full URL (viaRegURL), and, if desired, they can register additional URLs (via RegURL or RegURLs) or URLs for mobile formats.

When using this specification to create CIDs, the CID namespace is guaranteed to be unique for each ID Provider and their current ID Version (e.g. algorithm version), and the CID format is decimal. However, since the pre-identified content may have CIDs that overlap other CIDs used by the same ID Provider in this system, the ID Version (via IDVersion XML tag) is used to determine the proper CID namespace. For example, a CID representing a GID-96 EPC code has the hex format of HH.MMMMMMM.PPPP-PP.SSSSSSSSS where H is header (8 bits), M is Manufacture (28 bits or 268 million unique IDs), P is Product SKU (24 bits or 16 million unique IDs) and S is Serial Number (36 bits or 68 billion unique IDs). Thus, the ID Provider has an ID Version for the EPC GID-96 format, and different ID Versions for other EPC formats or other CID formats (e.g. DWM). When the embedder registers an EPC GID-96 format CID, it sends the corresponding ID Version.

Link to URL with Pre-Existing CID

The reader software detects the pre-existing CID, sends it to the router (via ResURL), receives URLs and displays them to the user.

In the background, the router, having access to the IDProviderID, ID Version and CID data, uses this globally unique combination to lookup the correct URLs. The proper ID Version is known by the reader since it needs to use that version of the algorithm to detect the CID.

Interoperable ID Technology from Multiple ID Providers

When one company licenses embedder and detector technology (i.e. OEM) to multiple ID Providers, there arises the user-desired solution where one ID Provider's reader can utilize a CID embedded with another ID Provider's embedder. However, the ID Provider desires "credit" for the embedding process; thus, this content routing system tracks the embedding ID Provider.

ID Provider ID Embedded in Content

Each ID Provider's embedder embeds their ID Provider ID along with the CID that is requested and embedded by the Content Provider (via CreateCID).

Embedding ID Provider ID Included with URL Requests

When the reader software reads a CID, it also reads the embedding ID Provider ID. If the embedding ID Provider ID is different than that stored in the reader, it is included in the URL resolution request message (via the EmbIDProviderID XML field). The Router logs the embedding ID Provider's ID for any further action, such as being properly compensated for the embedding process.

CMDS Section Conclusion

In conclusion, the companion specification provides valuable information to consumers, and enables a distributed routing architecture such that Content Providers manage their proprietary data and interaction with the consumer. Content Providers can include content owners, such as Record Labels, Movie Studios, stock photo agencies, etc., and retailers, such as Apple iTunes, Walmart (clicks-and-mortar), catalog companies, advertisers, Netflicks, etc.

Furthermore, the specification enables Content Providers to use any identity provider technology to link users to the proper information. In addition, when multiple ID Providers are sharing a content identification OEM algorithm, every router can seamlessly interoperate and track usage for proper payments. Importantly, the system enables multiple CIDs to exist in content such that the complete value chain (e.g. content owners and retailers) can participate, or create business rules for participation.

Furthermore, the specification is optimized for all identification technologies and existing systems, including digital watermarks (DWM), fingerprints (a.k.a. robust hashes), Electronic Product Codes (EPC), IFPI's Grid, and URI. Finally, the specification includes logging, not only for security tracing, but also for usage report that help ID Providers understand router demands and Content Providers understand content usage. The specification can easily be expanded to handle usage cases around seeding multiple ID systems and providing "buy now" functionality for non-legitimate content.

In the end, the specification should help content owners and retailers (thus distributors) increase sales (t ROI) by expanding the knowledge of content usage and making it easier for consumers to buy content and related items.

The following example implementation uses industry standard XML-based Web Service to provide an open interface to the Routers.

Overview of Example CMDS Implementation

The main components of the specification of this example CMDS implementation include:
  Registration Interface
    Registration Request Messages
    Registration Response Messages
  Resolution Interface
    Resolution Request Messages
    Resolution Response Messages
  Router Requirements The registration and resolution request messages use XML and include:
  Header
  Body
    Primary Information
    Secondary Information The response messages are simpler. The registration response message is simple, requiring no header or body sub-sections, and the resolution response message only includes primary and secondary information sub-sections.

ID Providers, Content Providers, and Users

To understand this example implementation, it is helpful to understand the relationship between ID Providers, Content Providers and Users.

ID Providers: Companies that provide the technology for content identification and to interface with a Router.

Content Providers: Providers of the content, such as the content owner and retailer, or any company with rights to distribute content and/or content metadata. For example, content owners can include Record Labels, Movie Studios, and Stock Photo Agencies. Retailers can include Apple iTunes, Wal-Mart (click-and-mortar), advertisers, catalog companies, and Napster.

Users: The end users of the system. For example, it may be a consumer linking to more information via their PC Multimedia jukebox, or a movie critic linking to current marketing materials via a closed, private system.

CID, ID Version, ID Provider ID and Globally Uniqueness

Furthermore, this example implementation is based upon a unique content identifier, labeled a CID. It is critical that CIDs are unique for each ID Provider ID and ID Version. CIDs can overlap for different ID Provider IDs or different ID Versions. ID Provider IDs are different for each ID Provider, and an ID Provider could register multiple ID Provider IDs, if determined as needed by the Registration Authority.

The ID Version is the version of the technology/algorithm that embeds and reads the CID. The ID Version is always known by the embedder and reader since they determine which algorithm to embed or read the CID. The ID Provider can have CIDs that overlap when they have different ID Versions, and uses different ID Version when CIDs can overlap.

For example, a video may have the same CID as a song, or one song embedded by ID Provider 1 may have the same CID as a different song embedded by ID Provider 2 (or by ID Provider 1 using a new ID Version).

As such, CIDs are not globally unique unless combined with these other variables. Thus, the combination created by appending IDProviderID, IDVersion and CID together (e.g. appending <IDProviderID><IDVersion><CID>) is a globally unique ID, usually a number.

Alternatively, the globally unique combination can be represented as a URI, formatted as "CMDS://<IDProviderID>.<IDVersion>.<CID>".

The advantages to dividing the namespace in this format are twofold: (1) fewer bits are needed to represent CIDs since CIDs can be re-used in new content or new algorithm versions, and (2) the system is easier to integrate with pre-existing identity systems such as EPC, fingerprinting and 4C/Verance DWM since the CIDs can overlap between these systems but be differentiated with the ID Version.

Finally, for many identification technologies, the CID is an integer, and it is most efficient for transport and backend/router processing to use an integer field. However, for other identification technologies a text field is required, and the router can process the text into a unique content identifier. As such, the CID format is determined by ID Version data, and properly handled by a Router. As an aside, two XML schemas will be present for these requests, one for an integer CID and one for a text CID. If possible, it is optimal to use the integer format. Along these lines, databases can be indexed by all three identifiers (IDProviderID, IDVersion and CID) as separate variables or databases, or one database can use this triplet ID as a globally unique index when the CID is integer format.

Registration Interface Specification

The registration process enables the content provider to obtain unique CIDs and link the CID to URLs. It also enables the ID Provider, Content Provider, and User to register contact information.

The registration works from both (i) an interactive human-readable web interface and (ii) a web services interface that interacts directly with registration software, such as a CID embedder (or multimedia plug-in for user registration) that runs on the vendor's or user's computer.

Secure Authenticated Channels

The client web and software interface uses a secure authenticated channel with the Router. This protection is required so that no one but the proper vendor can change the registration data.

Content Provider, ID Provider and User Registration

Content Providers and ID Providers initially register with the Registration Authority via a process that verifies them and the contact person to be a trusted provider. During this process, the Content Provider is assigned a unique vendor-name and password, and the ID Provider is assigned a unique numeric ID and password.

ID Providers are assigned a unique number rather than name for the following reasons: it is quicker for a Router to lookup a number, the ID Provider's software remembers the number (so the human readability is not important for remembering the unique identification), and the globally unique combination of IDProviderID, IDVersion, and CID is a number.

Once they receive their vendor info and password, Content Providers and ID Providers can update their contact information via their embedder software or directly with Registration Authorities interactive web site.

Users register via the reader software, which registers a username and password, and should provide the user the option to store the password for future usage. The reader software keeps the username and submits it with each resolution request, as well as offers the user the option to block sending the username (for one request or all future requests). In other words, this particular system is an opt-in system, with capabilities to opt-out.

Registration Request Message

The Registration Request Message is the interface that defines the message sent to a Router for data registration. The Registration Request Message interface includes an XML Header and Body. Examples are shown below, and the format is described below.

Registration Request Root Elements, Sub-Elements and Grouping

Registration request messages choose one root elements from several options, include: <RegistrationCIDRequest> for CreateCID and RegCID request codes; <RegistrationURLRequest> for RegURL, DelURL, RegURLs, and DelURLs request codes; and <RegistrationContactInfoRequest> for UpdateContentProvider, UpdateIDProvider, RegUser and UpdateUser request codes. (More root elements may be added when the handling of integer and text CIDs is finalized, e.g. RegistrationIntCIDRequest and RegistrationTextCIDRequest.) There are sub-elements, including: <Header> for message headers, <Body> for message body, and <PrimaryInfo> and <SecondaryInfo> when needed. Grouping of registration requests is allowed (and it is expected to be specified when the transmission method, e.g. SOAP, is finalized, as discussed below).

Registration Request Message XML Header

The XML header is:

| XML Tag | Format | Description | Status |
| --- | --- | --- | --- |
| Version | Integer | The version of this request message. The current version is 1. | Required |
| IDProviderID | Integer | Identity technology provider number as stored in the product (e.g. software) interacting with a Router. IDs 0-511 are reserved (as described below). | Required |
| RequestCode | Text | Requests a Router to take a specified action. | Required |

The allowable Request Codes for registration include:

| Request Code | Description |
| --- | --- |
| CreateCID | Create a unique content ID |
| RegCID | Register pre-existing CID from other unique identification standard |
| RegURL | Register one URL |
| DelURL | Delete one URL |
| RegURLs | Register several URLs |
| DelURLs | Delete several URLs |
| UpdateContentProvider | Update Content Provider contact information |
| UpdateIDProvider | Update ID Provider contact information |
| RegUser | Register new username, password and contact information |
| UpdateUser | Update user contact information |

This header data can help the router quickly distribute the message to various request handlers for the detailed actions to be handled.

The request codes RegURLs and DelURLs register or delete multiple URLs in one message, which requires less interaction from the registration software but requires parsing by the Router.

The ID Provider IDs' 0-to-511 are reserved, such as for the case when the ID Provider embeds their ID within the content since there are several interoperable readers.

Registration Request Message XML Body

For each Request Code, the Resolution Message XML Body includes the following information.

Request Codes: CreateCID and RegCID

The XML body has primary information, which includes CID related variables, for the registration request, and secondary information which includes optional descriptive data for the CID.

The primary request information is:

| XML Tag | Format | Description | Status |
| --- | --- | --- | --- |
| ContentProviderName | Text | Content Provider name. | Required |
| Password | Text | Content Provider password. | Required |
| IDVersion | Integer | The version of the CID algorithm. | Required |
| CID | Integer or Text | The unique content ID formatted as integer (preferable) or text, as determined by the ID Version. | Required for RegCID |
| CIDExpiration | Date | Expiration date for CID so it can be reused. Use with caution (as described below) | Optional |

-continued

| XML Tag | Format | Description | Status |
|---------|--------|-------------|--------|
| Private | Binary | Binary data that can be used by the ID Provider for any private reason. | Optional |

The CID Expiration field should be used with great caution since content may exist for a long time. It is most relevant to temporary content, like news papers or catalogs. The secondary request information is:

| XML Tag | Format | Description | Status |
|---------|--------|-------------|--------|
| Title | Text | Title of the content. | Optional |
| Copyright | Text | Copyright dates. | Optional |
| AdultFlag | Boolean | TRUE for adult content, and FALSE for all other content | Optional |
| ContentType | Text | Content type choices include: audio-music, audio-speech, video videotrack, video-audiotrack, image, and text. | Optional |
| ArtistName | Text | Artist's full name | Optional |
| ArtistEmail | Text | Artist's email address | Optional |
| ArtistPhone | Text | Artist's phone number | Optional |
| ArtistURL | Text | ID Provider, Content Provider or User Artist web page. | Optional |

Request Codes: RegURL, DelURL, RegURLs and DelURLs
The XML body information is:

| XML Tag | Format | Description | Status |
|---------|--------|-------------|--------|
| ContentProviderName | Text | Content provider name. | Required |
| Password | Text | Content provider password. | Required |
| IDVersion | Integer | The ID version provides the version of the CID algorithm. | Required |
| CID | Integer or Text | The unique content ID formatted as integer (preferable) or text, according to the IDVersion. | Required |
| Primary | Boolean | TRUE for Primary URL, and FALSE for Additional URLs. | Required |
| URLType | Text | The URL Type, such as for a WAP enabled cell phone or fully functional PC (more details below). | Required |
| URL | Text | The URL that links the content to more information. | Required |
| URLVariables | Text | A list of XML tags, separated by a colon ":", that define the XML fields which are appended at the end of the URL or the term ALL for all of the request tags (more details below). | Optional |
| URLActivation | Date | Date to activate the URL. If no date is set, the URL is activated, and remains active unless it has expired. | Optional |
| URLExpiration | Date | Date to de-activate URL. If no date is present, the URL has no expiration, and is active, unless it has not yet been activated. | Optional |
| Desc | Text | Brief description of URL, less than 128 characters with spaces | Required, except for DelURL and DelURLs |
| Private | Binary | Binary data that can be used by the ID Provider for any private reason. | Optional |

The allowable URL Types (for all request codes that include this field):

| URL Type Code | Description |
|---------------|-------------|
| Full | Fully functional web pages |
| WAP | Wireless Application Protocol (WAP) web page |
| WMI | W3C Mobile Web Initiative (MWI) |

The URL Variables enables the URL to deep link into a database.

For RegURLs, a list of Primary, URLType, URL, URLVariables, URLActivation, URLExpiration, and Desc data elements are separate by semicolons ";".

The field has an entry for each URL (a space for no data is okay), or not be used at all For DelURL and DelURLs, the data elements in URLVariables, URLActivation, URLExpiration, and Desc are optional, and are ignored if included.

For DelURLs, a list of Primary, URLType and URL data elements are separated by semicolons ";".

The other fields, including IDVersion and CID, remains constant

URLs are categorized into Primary and Additional URLs, where there can be one Primary URL for each URL Type and as many additional URLs as desired. This categorization allows immediate redirection for the user, as well as choice of all associated URLs (i.e. additional actions) for the user. In other words, Primary URLs enable the system to automatically display the primary web site for the user, thus not requiring the user to click on the desired URL after selecting to receive more information. There is a balance, since while reducing the number of required clicks, Primary URLs also reducing the choices and retail opportunities.

Request Codes: UpdateContentProvider, UpdateIDProvider, RegUser and UpdateUser

| XML Tag | Format | Description | Status |
|---|---|---|---|
| RegName | Text | Content Provider Name, Username, or ID Provider ID. The ID Provider ID is converted to an integer inside the router's handler. | Required |
| Password | Text | ID Provider, Content Provider or User password | Required |
| BizName | Text | Company's full name | Required, except for RegUser and UpdateUser |
| BizEmail | Text | Company's email address | Optional |
| BizAddress1 | Text | Company's street address, first line | Required, except for RegUser and UpdateUser |
| BizAddress2 | Text | Company's street address, second line | Optional |
| BizCity | Text | Company's city | Required, except with RegUser and UpdateUser |
| BizState | Text | Company's state | Required, except with RegUser and UpdateUser |
| BizZip | Text | Company's zip | Required, except with RegUser and UpdateUser |
| BizCountry | Text | Company's country | Required, except with RegUser and UpdateUser |
| BizPhone | Text | Company's phone number | Optional |
| BizURL | Text | ID Provider, Content Provider or User company web page. | Optional |
| BizLogoURL | Text | ID Provider or Content Provider company logo. | Optional |
| BizTemplateURL | Text | ID Provider or Content Provider company template. | Optional |
| NameTitle | Text | Contact's name title (e.g. Mr., Ms., etc.) | Optional |
| NameFirst | Text | Contact's first name | Required |
| NameMiddle | Text | Contact's middle name or initial | Optional |
| NameLast | Text | Contact's last name | Required |
| NameSuffix | Text | Contact's name suffix (e.g. JR., III, etc.) | Optional |
| Email | Text | Contact's email address | Required |
| Address1 | Text | Contact's street address, first line | Required, except for RegUser and UpdateUser |
| Address2 | Text | Contact's street address, second line | Optional |
| City | Text | Contact's city | Required, except for RegUser and UpdateUser |
| State | Text | Contact's state | Required, except for Reg User and UpdateUser |
| Zip | Text | Contact's zip | Required |
| Country | Text | Contact's country | Required |
| Phone | Text | Contact's phone number | Required, except for RegUser and UpdateUser |
| Cell | Text | Contact's cell phone number | Optional |
| Fax | Text | Contact's fax number | Optional |
| IM | Text | Contact's instant message address | Optional |
| Language | Text | Contact's preferred spoken language. | Optional |
| Sex | Text | Contact's Sex (M or Male, or F or Female) | Optional |
| Age | Integer | Contact's Age | Optional |
| Private | Binary | Binary data that can be used by the ID Provider for any private reason. | Optional |

The XML body information is:
List of countries from Windows XP "Region and Language Options" in Control Panel
List of languages from Windows XP "Region and Language Options" in Control Panel Registration Response Message The Registration Response Message is the interface that defines the message sent from a Router in response to data registration. The Registration Response interface includes a success code, URL and brief description of the URL, or error code and associated URL and description, as well as private data. Examples are shown below, and the format is described below.

Registration Response Root Element and Grouping

All registration response messages have one root element of <RegistrationResponse> (and </RegistrationResponse>), and no sub-elements. Grouping of registration requests is allowed (and it is expected to be specified when the transmission method, e.g. SOAP, is finalized).

Registration Response XML Message

The registration response message XML format for all requests is:

| XML Tag | Format | Description | Status |
|---|---|---|---|
| Version | Integer | The version of this request message. The current version is 1. | Required |
| RtnCode | Integer | Return code where "0" means success and any positive number as an error code. For this version, the only valid error code is "1". | Required |
| URL | Text | URL, or list of URLs separated by semicolons ";" | Optional |
| Desc | Text | Brief description of URL or error, or list of descriptions of URLs, with each description or error text having 128 characters or less including spaces, and separated by semicolons ";". | Required for errors |
| Private | inary | Binary data that can be used by the ID Provider for any private reason. | Optional |

For the RtnCode, error codes, like "2", may be defined in the future such that the system can automatically handle the error. For this version, providing the vendor or user with the error text is enough, and, thus, "1" is the only valid error code.

Registration Response Message Data

For the request for a unique ID (CreateCID): the message returns a "0" for success in the RtnCode field and the CID in the Desc field—or "1" for error in the RtnCode, the error URL in the URL field, and the error text in the Desc field.

For the request for registering CIDs from other system ID (RegCID): the message returns a "0" for success in the RtnCode field—or "1" for error in the RtnCode, the error URL in the URL field, and the error text in the Desc field.

For the request to register or delete a URL (RegURL, DelURL, RegURLs, and DelURLs): the message returns a "0" for success in the RtnCode field—or "1" for error in the RtnCode, the error URL in the URL field, and the error text in the Desc field.

For the request for content provider, ID provider or user registration (UpdateContentProvider, UpdateIDProvider, RegUser, and UpdateUser): the message returns a "0" for success in the RtnCode field and RegName (e.g. ContentProviderName, IDProviderID, or UserName) in the Desc field for optional verification—or "1" for error in the RtnCode, the error URL in the URL field, and the error text in the Desc field.

Content Provider Display

The Content Provider is notified of the success or error. In the case of error, the error text and URL shall be displayed.

Resolution Interface Specification

The resolution architecture connects the readers to a Router such that content identification can be used to provide users with interesting related data and purchasing opportunities.

The resolution interface employs a web services interface.

Secure Authenticated Channel for Request Address

The web services interface uses a secure authenticated channel with the Router for ResRegAddress and ResResAddress. This protection is required to eliminate spoofing of the Router.

Resolution Request Message

The Resolution Request Message is the interface that defines the message sent to a Router for data lookup. The Resolution Request Message interface includes an XML Header and Body. Examples are shown and the format is described below.

Resolution Request Root Elements, Sub-Elements and Grouping

Resolution request messages choose one of two root elements: <ResolutionURLRequest> for ResURL and ResURLs request codes; and <ResolutionAddressRequest> for ResRegAddress and ResResAddress request codes. (More root elements may be added when the handling of integer and text CIDs is finalized, e.g. ResolutionURLintRequest and ResolutionURLtextRequest.) There are sub-elements, including: <Header> for message headers, <Body> for message body, and <PrimaryInfo> and <SecondaryInfo> when needed. Grouping of registration requests is allowed (and it is expected to be specified when the transmission method, e.g. SOAP, is finalized). Grouping is useful when the ID Provider reader can read multiple CIDs embedded in the content (e.g. one CID from a content owner and one CID from a retailer).

Resolution Request Message XML Header

The XML header is the same as for a registration request. This header data can help the router quickly distribute the message to various request handlers for the detailed actions to be handled.

The allowable Request Codes for resolution include:

| Request Code | Description |
|---|---|
| ResURL | Resolve the primary URL |
| ResURLs | Resolve the primary and additional URLs |
| Res2ndInfo | Resolve the secondary information |
| ResRegAddress | Resolve the address of the Registration Router for registration requests |
| ResResAddress | Resolve the address of the Resolution Router for resolution requests |

Resolution Request Message XML Body

For each Request Code, the Resolution Message XML Body includes the following information.

Request Code: ResURL, ResURLs and Res2ndInfo

For these request codes, the message includes primary and secondary information. The Primary Information portion contains the data required to properly service the request. The Secondary Information contains user-specific data and is intended for user specific links and aggregate usage monitoring and reporting.

Privacy issues should be considered when sending the secondary information. Preferably, the user permits the secondary information to be sent.

The primary request information includes:

| XML Tag | Format | Description | Status |
|---|---|---|---|
| Timestamp | Time | Time stamp of triggering event. Used to aid in management of "stale" requests that have timed out. Format is Coordinated Universal Time (e.g. 2005-04-14T13:20:00Z) | Required |
| EmbIDProviderID | Integer | The ID Provider ID that embedded the CID, if different than that of the reader software ID Provider ID | Required if different than IDProviderID, otherwise blank |
| IDVersion | Integer | The ID version provides the version of the CID algorithm. | Required |
| CID | Integer or Text | The unique content ID formatted as integer (preferable) or text, as defined by the IDVersion. | Required |
| URLType | Text | The URL Type, such as for a WAP enabled cell phone or fully functional PC. | Required, except for Res2ndInfo |
| Response2ndInfo | Boolean | TRUE if secondary response information is requested, and FALSE if not. (It is not signaling that secondary request information is included in this request). | Required, ignored for Res2ndInfo |
| Private | Binary | Binary data that can be used by the ID Provider for any private reason. | Optional |

Private data could, for example, include part of an image or audio so the server can detect the embedded CID. The binary data format should be known by the ID Provider handler, as well as preferably included in the header of the binary data.

The secondary request information includes:

| XML Tag | Format | Description | Status |
|---|---|---|---|
| ReaderID | Integer | A unique ID that identifies the reader application per purchase or installation. (More details below) | Optional |
| TransactionID | Integer | A unique ID that identifies the transaction for the reader. (More details below) | Optional |
| OS | Text | Operating system, including Windows, WinCE, Mac, Symbian, J2ME, BREW, PALM OS, Microsoft Smartphone/Pocket PC | Optional |
| OSVersion | Text | Request OS for version from OS and send in same format | Optional |
| GPS | Text | GPS coordinates of requesting device, if available | Optional |
| Username | Text | Identification of the user and links to data that the user has registered | Optional |
| sLanguage | Text | User's preferred spoken language. | Optional |
| sSex | Text | User's Sex (M or Male, or F or Female) | Optional |
| sAge | Integer | User's Age | Optional |
| sZip | Text | User's postal code | Optional |
| sCountry | Text | User's Country. | Optional |

The Reader ID eliminates the statelessness of a Web Services request and enables useful usage tracking. It is optional due to privacy concerns and shall be able to be turned off by the user.
  It can be calculated from the reader machine or pre-assigned via purchase/activation codes, where the latter is preferable for mobile devices that may not be able to generate GUIDs.
The Transaction ID provides further tracking upon the reader ID, and can also be turned off by the user.
  It can be as simple as starting with 1 and counting each transaction by that reader.
Note that "s" in front of variables means that it is the secondary information, and allows anonymous data aggregation without a user registering.

If the Username is included, none of these "s" variables are needed since they have been registered by the user and are stored in a Router sLanguage uses the list of languages from Windows XP "Region and Language Options" in Control Panel sCountry uses list of countries from Windows XP "Region and Language Options" in Control Panel As such, the following actions are enabled:
Aggregate usage monitoring and reporting
Secondary data about the user to be used for detailed usage monitoring and user specific resolution responses
Request Code: ResRegAddress and ResResAddress
For this request codes, the message includes:

| XML Tag | ormat | Description | Status |
|---|---|---|---|
| Timestamp | Time | Time stamp of triggering event. Used to aid in management of "stale" requests that have timed out. Format is | Required |

-continued

| XML Tag | Format | Description | Status |
|---|---|---|---|
| ReaderIP | Text | Coordinated Universal Time (e.g. 2005-04-14T13:20:00Z) IP address of the embedder or reader. Utilized to determine the correct registration and resolution Router addresses with which to interface. | Required |

Resolution Response Message

The Resolution Response Message is the interface that defines the message from a Router in response to data lookup. The Resolution Response interface has primary information, which includes a success code, URL and brief description of the URL, or error code and associated text, and has secondary information which provides content-specific metadata. Examples are shown below, and the format is described below.

Resolution Response Root Element, Sub-Elements and Grouping

All resolution response messages have one root element: <ResolutionResponse> (and </ResolutionResponse>), and sub-elements of <PrimaryInfo> and <SecondaryInfo>. Grouping of resolution requests is allowed (and it is expected to be specified when the transmission method, e.g. SOAP, is finalized). Grouping is useful when the ID Provider reader can read multiple CIDs embedded in the content (e.g. one CID from a content owner and one CID from a retailer).

Resolution Response XML Message

The XML primary response information for all requests is:

| XML Tag | Format | Description | Status |
|---|---|---|---|
| Version | Integer | The version of this request message. The current version is 1. | Required |
| RtnCode | Integer | Return code where "0" means success and any positive number as an error code. For this version, the only valid error code is "1". | Required |
| URL | Text | URL, or list of URLs separated by semicolons ";" | Required for successful resolution requests, Optional otherwise |
| Desc | Text | Brief description of URL or error, or list of descriptions of URLs, with each description or error text having 128 characters or less including spaces, and separated by semicolons ";". | Required, except for Res2ndInfo and ResRegAddress and ResResAddress |
| BizLogoURL | Text | Content Provider's URL for their company logo. | Optional, except for ResURL, ResURLs, and Res2ndInfo if registered by the Content Provider |
| BizTemplateURL | Text | Content Provider's URL for their desired display template. | Optional, except for ResURL, ResURLs, and Res2ndInfo if registered by the Content Provider |
| Private | Binary | Binary data that can be used by the ID Provider for any private reason. | Optional |

For the RtnCode, error codes, like "2", may be defined in the future such that the system can automatically handle the error. For this version, providing the vendor or user with the error text is enough, and, thus, "1" is the only valid error code (and "0" or "1" are the only valid RtnCodes).

The URL Variables are added to the URL after a question mark "?" either as XML data (i.e. between their XML tags) or as text formatted as XML tag=data, both with colons ":" between the XML tags XML data example=<IDVersion>1<ADVersion>:CID=999 <CID>999</CID>

Text example=IDVersion=1:CID=999

Thus, the URL that is returned can point deep inside a database

BizLogoURL and BizTemplateURL are required if they were registered by the Content Provider and the request code is ResURL, ResURLs or Res2ndInfo.

If they were never been registered, they are optional.

The XML secondary response information for all requests is required for Res2ndInfo request codes or when the Response2ndInfo flag is set:

| XML Tag | Format | Description | Status |
|---|---|---|---|
| Title | Text | Title of the content. | Required for 2ndInfo request |
| Copyright | Text | Copyright dates. | Required for 2ndInfo request |
| AdultFlag | Boolean | "1" for adult content, and "0" for all other content | Required for 2ndInfo request |
| ContentType | Text | Content type choices include: audio - music, audio - speech, video - video track, video - audio track, image and text. | Required for 2ndInfo request |
| ArtistName | Text | Artist's full name | Required for 2ndInfo request |
| ArtistEmail | Text | Artist's email address | Required for 2ndInfo request |
| ArtistPhone | Text | Artist's phone number | Required for 2ndInfo request |
| ArtistURL | Text | Artist web page. | Required for 2ndInfo request |
| BizName | Text | Company's full name | Required for 2ndInfo request |

-continued

| XML Tag | Format | Description | Status |
|---|---|---|---|
| BizEmail | Text | Company's email address | Required for 2ndInfo request |
| BizAddress1 | Text | Company's street address, first line | Required for 2ndInfo request |
| BizAddress2 | Text | Company's street address, second line | Required for 2ndInfo request |
| BizCity | Text | Company's city | Required for 2ndInfo request |
| BizState | Text | Company's state | Required for 2ndInfo request |
| BizZip | Text | Company's zip | Required for 2ndInfo request |
| BizCountry | Text | Company's country | Required for 2ndInfo request |
| BizPhone | Text | Company's phone number | Required for 2ndInfo request |
| BizURL | Text | Company web page. | Required for 2ndInfo request |

This secondary information comes from a combination of data included when registering a CID and when registering a Content Provider. Although the fields are required for Res2ndInfo or when the Response2ndInfo flag is set, many of the fields are optional when registering and, thus, may not be returned (or be returned blank) even when requested. The secondary information enables the user to view basic artist information, such as may be desirable for photos from a stock agency, and content provider information, which is probably desirable for all content.

Resolution Response Message Data

For the request for URL (ResURL): the message returns a "0" for success in the RtnCode field, the primary URL in the URL field, the brief description of the URL in the Desc field, and the secondary information if requested—or "1" for error in the RtnCode, the error URL in the URL field, and the error text in the Desc field. The Primary URL has been registered with the Primary flag set, and matches the requested ID Provider ID, ID Version, CID and URL Type.

For the request for all URLs (ResURLs): the message returns a "0" for success in the RtnCode field, the list of all URLs with the primary URL listed first, separated by semi-colons ";" in the URL field, the list of brief descriptions of the URLs, separated by semicolons ";" in the Desc field, and the secondary information if requested—or "1" for error in the RtnCode, the error URL in the URL field, and the error text in the Desc field. The URLs all match the requested ID Provider ID, ID Version, CID and URL Type. For each URL Type, there is only one primary URL and it is listed first. The secondary information does not have multiple items in each field since it is linked to the CID and not to the URLs. In other words, the secondary info does not change with URLs, only CIDs.

For the request of secondary information (Res2ndInfo): the message returns a "0" for success in the RtnCode field, and the secondary information in the corresponding fields—or "1" for error in the RtnCode, the error URL in the URL field, and the error text in the Desc field.

For the request of the Router address (ResRegAddress and ResResAddress): the message returns a "0" for success in the RtnCode field, the local Routers' web or IP address in the URL field—or "1" for error in the RtnCode, the error URL in the URL field, and the error text in the Desc field.

User Display

When only the primary URL exists, the reader software launches a web browser with the primary URL, such that the primary web page is "immediately" displayed for the user. This always happens with ResURL, and may happen with ResURLs.

When requesting multiple URLs, the reader software displays the links and descriptions with the Content Provider's logo and template, if BizLogoURL and BizTemplateURL fields have been registered by the Content Provider. If not, the reader can use its proprietary template. The template defines which secondary CID information (e.g. title, copyright, adult flag content type, artist info and content provider company info) is displayed. The template uses the corresponding XML tags (in between < >) for the secondary data as variables to display this data.

If the reader is always connected, it should read the CID, request secondary information (potentially caching URLs), and then display to the user that more information is available from <BizName>. This approach causes the response to be immediate upon the user's selection of more information and removes the chance that the user selects more information and no URLs have been registered. In addition, if the content includes multiple CIDs, e.g. one from the content owner and one from the retailer, it also enables the user to differentiate the information source.

Router Requirements

The following requirements enable the Router system to function properly and provide value to vendors and users.

CID & URL Requirements

A Router guarantees that requested or registered CIDs are unique for the given ID Provider ID and ID Version. For requested CIDs, the generating algorithm should guarantee unique IDs. For registered CIDs, the system checks the databases to make sure the CID has not already been registered by that ID Provider with that ID Version. If it has been registered, the system should send back an appropriate error.

When registering URLs, the system checks that a CID has been registered by the requesting Content Provider name, ID Provider ID and IDVersion. If not, the system should send back an appropriate error.

A Router guarantees that there is only one Primary URL registered for each URL Type given the ID Provider ID, ID Version and CID.

The Databases include:
  The date that a CID is registered (CIDRegDate) and last modified (CIDModDate)
  The date that a URL is registered (URLRegDate) and last modified (URLModDate)

Log Files and Usage Reports

Log file saves the request time, response delay (in milliseconds), request IP address and registration or resolution XML message, excluding private data, for every request. Log files at least span the previous 6 months.

The aggregate usage data should be visible to the registered ID Providers and Content Providers via an interactive, secure web site, with abilities to export to excel or delimited (tab or comma) text files for download or automatic emailing. Daily, weekly and monthly reports shall be automatically generated for immediate viewing or export. Monthly usage reports should be kept for the life of the system, daily and weekly reports for two years.

Reports include:
1. For each CID registered by each Content Provider, and for all CIDs registered by each ID Provider and each Content Provider, for the requested date range
  1.1. For all users and users sending secondary information (including registered users and user sending anonymous secondary information)
    1.1.1. Total successful links
    1.1.2. Aggregate links per date (in the date range)
    1.1.3. Aggregate links per hour for a 24 hour period
    1.1.4. Aggregate links per day of the week
    1.1.5. Aggregate links per IP address
    1.1.6. Average response time
    1.1.7. Total unsuccessful links grouped by error code
  1.2. For users sending secondary information
    1.2.1. Aggregate links per reader ID (which enables ranking of anonymous users)

1.2.2. Aggregate links per username (which enables ranking of registered users)
1.2.3. Aggregate links per country
1.2.4. Aggregate links per zip
1.2.5. Aggregate links per sex
1.2.6. Aggregate links per age
1.2.7. Aggregate links per group
1.2.8. Aggregate links per language The reports allow Content Providers to access CID specific usage statistics.

The age groups are defined as:

| Age Group Code | Age Group Description |
| --- | --- |
| Age 0-5 | Users between birth and 5 years old |
| Age 6-10 | Users between 5 and 10 years old |
| Age 11-15 | Users between 11 and 15 years old |
| Age 16-20 | Users between 16 and 20 years old |
| Age 21-25 | Users between 21 and 25 years old |
| Age 26-30 | Users between 26 and 30 years old |
| Age 31-40 | Users between 31 and 40 years old |
| Age 41-50 | Users between 41 and 50 years old |
| Age 51-60 | Users between 51 and 60 years old |
| Age 61-80 | Users between 61 and 80 years old |
| Age 81+ | Users over 81 years old |

The registered vendors shall also be able to create custom reports with any begin and end data in the last 2 years. These custom reports will take a little time to calculate since daily reports have to be analyzed. The system may allow for custom reports with fields not included in the report list below for the last 6 months. These reports will take some time to calculate since they require log files to be analyzed.

Distributed Architecture

In order for the distributed architecture of the Router to function properly and be able to be expanded in the future, the following occur.

The reader requests the web or IP address of registration and/or resolution router, which ever are applicable, every week. Thus, the system architecture can be dynamically changed every week.

The number of Mirror Routers is set by the Registration Authority. The Mirror Routers forward all registration requests immediately to the Central Router, and wait its response that the information is correct (or the CID is unique). They also send aggregate usage files to the Central Router and synchronize with the Central Database daily. The daily time is not sent so that they don't all hit the Central Router simultaneously. Finally, they forward resolution requests for CIDs that don't exist in their database and wait for the response before responding to the User, to make sure they were not registered during that recent day.

XML Schemas

The XML schemas are specified, most likely, with grouped (e.g., within WSDL) as follows:

Registration CID Request Message Schema for CreateCID and RegCID request codes
  One for integer and one for text CIDs
Registration URL Request Message Schema for RegURL, DelURL, RegURLs, and DelURLs request codes
  One for integer and one for text CIDs
Registration Contact Information Request Message Schema for UpdateContentProvider, UpdateIDProvider, RegUser and UpdateUser request codes
Registration Response Message Schema as used by all registration requests
Resolution Request Message Schema for ResURL, ResURLs, and Res2ndInfo request codes
  One for integer and one for text CIDs
Resolution Request Message Schema for Request Router addresses via ResRegAddress and ResResAddress
Resolution Response Message Schema as used by all resolution requests Packing and Transmission Methods The XML packing and transmission methods need to be specified, and include http, https, WSDL, SOAP and secure Web Services, such as SAML, WS-License or WS-Security. Public key architecture, such as described in XKMS, X-KRSS, and X-KISS, is probably not required since this example implementation has Content Provider Name and password as part of the standard XML message interface, and the contact data is not mission critical.

Importantly, the http or https link should be maintained from request to response, and only broken after the response is received, thus increasing efficiency and reducing risk of firewall interfering with the response (as well as not requiring the client embedder or reader software to act as a server).

Database Elements

Describing the database elements and possible arrangements helps the reader understand the interface and router since it provides an overview of how the requests are handled.

Database Management

Database management is desirable and includes:
  Check URLs at least once a month
    Report dead URLs to Content Provider (using contact person's email) whom requested the CID and registered the related URL
    Uses CID Owner Information
    Report CIDs with no Primary URL but with additional URLs to Content Provider
      This assumes that a CID with no URLs at all has not been distributed yet or is not used for that URL Type Database Information The Primary Databases include the following information. The structure does not need to be as implied by the tables. However, the tables provide a nice outline and help to conceptually understand how the message interface is used.

CID Owner Information

| | | | | Label | | | |
| --- | --- | --- | --- | --- | --- | --- | --- |
| | ContentProviderName | IDProviderID | IDVersion | CID | CIDExpiration | CIDRegDate | CIDModDate |
| Type | Text | Integer | Integer | Integer or Text | Date | Date | Date |

| | | | | Label | | | |
| --- | --- | --- | --- | --- | --- | --- | --- |
| | Title | Copyright | AdultFlag | ContentType | ArtistName | ArtistEmail | ArtistPhone | ArtistURL |
| Type | Text | Text | Boolean | Text | Text | Text | Text | Text |

This information is entered when requesting a CID (CreateCID) or when registering pre-existing CID from another ID standard (RegCID).
    the CID for RegCID is checked for uniqueness given ID Provider ID and ID Version CID Link Information

| | | | Label | | | | |
|---|---|---|---|---|---|---|---|
| | IDProviderID | IDVersion | CID | Primary | URL Type | URL | URLVariable | Desc |
| Type | Integer | Integer | Integer or Text | Boolean | Byte | Text | Text | Text |

| | | Label | | |
|---|---|---|---|---|
| | URLActivation | URLExpiration | URLRegDate | URLModDate |
| Type | Date | Date | Date | Date |

This information is entered or removed when a URL is registered or deleted (RegURL and RegURLs or DelURL and DelURLs), respectively
    Check that only one Primary URL for each URL Type is registered when registering a primary URL with RegURL (as described in the spec)
There may be one database or several databases
    There could be a different database for each ID Provider ID, or ID Provider ID and ID Version.
    The database could combine ID Provider ID, ID Version, and CID to one index.
        There could be two databases, one for numeric combinations (where CID is an integer) and one for text combinations (where CID is text based) or one database with a text index. The registration or resolution schema could be used to determine which database to use. The integer combination is optimal for efficiency.
Fields may be combined.
    For example, rather than having URLType, URL and Description, there may be FullURL, FullDesc, WAPURL, WAPDesc, WMIURL, WMIDesc—or any combination.
The database can convert URL Type text to integer for speed
    URL Type: Full=1, a WAP=2 and a WMI=3.
The Secondary Databases include the following information:

Content Provider, ID Provider and User Information

<RegName> is ContentProviderName, IDProviderID, or UserName

<type> is Text, Integer, or Text for ContentProvider, ID Provider or User databases, respectively Boolean can be stored with TRUE=1 and FALSE=0
Sex can be stored as Boolean with Female=TRUE=1 and Male=FALSE=0

Registration Message Examples

Create a Content ID

Request Message (CreateCID)

```
<RegistrationCIDRequest>
    <Header>
        <Version>1</Version>
        <IDProviderID>123</IDProviderID>
        <RequestCode>CreateCID</RequestCode>
    </Header>
    <Body>
        <PrimaryInfo>
            <ContentProviderName>Disney</ContentProviderName>
            <Password>walt4pres</Password>
            <IDVersion>1</IDVersion>
        </PrimaryInfo>
        <SecondaryInfo>
            <Title>Fantasia</Title>
            <Copyright>1960</Copyright>
            <AdultFlag>0</AdultFlag>
            <ContentType>video-videotrack</ContentType>
            <ArtistEmail>fantasia@disney.com</ArtistEmail>
        </SecondaryInfo>
    </Body>
</RegistrationCIDRequest>
```

| Label | <RegName>* | Password | BizName | BizEmail | BizAddress1 | BizAddress2 | BizCity |
|---|---|---|---|---|---|---|---|
| Type | <type> | Text | Text | Text | Text | Text | Text |

| Label | BizState | BizZip | BizCountry | BizPhone | BizURL | BizLogoURL | BizTemplateURL |
|---|---|---|---|---|---|---|---|
| Type | Text | Text | Text | Text | Text | Text | Text |

| Label | Name | Email | Address1 | Address2 | City | State | Zip | Country | Phone | Cell | Fax |
|---|---|---|---|---|---|---|---|---|---|---|---|
| Type | Text | Text | Text | Text | Text | Text | Text | Text | Text | Text | Text |

| Label | IM | Language | Sex | Age |
|---|---|---|---|---|
| Type | Text | Text | Text | Integer |

Response Message (CreateCID)

```
<RegistrationResponse>
    <Version>1</Version>
    <RtnCode>0</RtnCode>
    <Desc>999</Desc>
</RegistrationResponse>
```

Register a Pre-Existing Content ID
Request Message (RegCID)

```
<RegistrationCIDRequest>
    <Header>
        <Version>1</Version>
        <IDProviderID>321</IDProviderID>
        <RequestCode>RegCID</RequestCode>
    </Header>
    <Body>
        <PrimaryInfo>
            <ContentProviderName>Apple</ContentProviderName>
            <Password>1984year</Password>
            <IDVersion>2</IDVersion>
            <CID>111</CID>
        </PrimaryInfo>
        <SecondaryInfo>
            <Title>Fantasia</Title>
            <Copyright>1960</Copyright>
            <AdultFlag>0</AdultFlag>
            <ContentType>video-audiotrack</ContentType>
        </SecondaryInfo>
    </Body>
</RegistrationCIDRequest>
```

Response Error Message (RegCID)

```
<RegistrationResponse>
    <Version>1</Version>
    <RtnCode>1</RtnCode>
    <URL>http://www.cmds.com/error/error8.html</URL>
    <Desc>
        CID is already registered. Please verify the CID and ID
        Version and try again.
    </Desc>
</RegistrationResponse>
```

Register Multiple URLs

Registering one URL with RegURL is extremely similar except there is only one data element in the Primary, URLType, URL, URLVariables, URLActivation, URLExpiration, and Desc fields. Alternatively, multiple URLs can be registered by grouping multiple RegURL calls in the transmission. Deleting one or more URLs with DelURL or DelURLs is very similar except that URLVariables, URLActivation, URLExpiration, and Desc are optional, and ignored if included. As for RegURL, in DelURL, there is only one URL included in the URL XML field.

Request Message (RegURLs)

```
<RegistrationURLRequest>
    <Header>
        <Version>1</Version>
        <IDProviderID>123</IDProviderID>
        <RequestCode>RegURLs</RequestCode>
    </Header>
    <Body>
        <ContentProviderName>Disney</ContentProviderName>
        <Password>walt4pres</Password>
        <IDVersion>1</IDVersion>
        <CID>999</CID>
        <Primary>1;1;0;0;0;0</Primary>
        <URLType>Full;WAP;Full;WAP;Full;WAP</URLType>
        <URL>
            www.disney.com/fantasia;
            wap.disney.com/fantasia;
            www.disney.com/fantasia/music;
            wap.disney.com/fantasia/music;
            www.amazon.com/search?fantasia;
            wap.amazon.com/search?fantasia;
        </URL>
        <URLVariables>
            IDProviderID:IDVersion:CID:ReaderID:OS:Username;
            IDProviderID:IDVersion:CID:ReaderID:OS:Username;
            IDProviderID:IDVersion:CID:ReaderID:OS:Username;
            IDProviderID:IDVersion:CID:ReaderID:OS:Username;
            IDProviderID:IDVersion:CID:ReaderID:OS:Username;
            IDProviderID:IDVersion:CID:ReaderID:OS:Username;
        </URLVariables>
        <Desc>
            Fantasia movie info from Disney.com;
            Fantasia movie info from Disney.com (WAP Format);
            Fantasia music info from Disney.com;
            Fantasia music info from Disney.com (WAP Format);
            Fantasia memorabilia from Amazon.com;
            Fantasia memorabilia from Amazon.com (WAP format);
        </Desc>
    </Body>
</RegistrationURLRequest>
```

Response Message (RegURLs)

```
<RegistrationResponse>
    <Version>1</Version>
    <RtnCode>0</RtnCode>
</RegistrationResponse>
```

Register a User

Updating a Content Provider, ID Provider or User is very similar to registering a User, except that the name and password have already been assigned as opposed to being checked for uniqueness. In addition, the User does not need to enter business information.

Request Message (RegUser)

```
<RegistrationContactInfoRequest>
    <Header>
        <Version>1</Version>
        <IDProviderID>123</IDProviderID>
        <RequestCode>RegUser</RequestCode>
    </Header>
    <Body>
        <RegName>klevy</RegName>
        <Password>ken1sgreat</Password>
        <BizName>AIPL</BizName>
        <BizEmail>levy@aipl.com</BizEmail>
        <BizAddress1>110 NE Cedar Street</BizAddress1>
        <BizCity>Stevenson</BizCity>
        <BizState>WA</BizState>
        <BizZip>98648</BizZip>
        <BizCountry>USA</BizCountry>
        <BizPhone>509-427-5374</BizPhone>
        <BizURL>www.AIPL.com</BizURL>
        <NameFirst>Ken</NameFirst>
        <NameLast>Levy</NameLast>
        <Email>levy@aipl.com</Email>
        <Address1>110 NE Cedar Street</Address1>
        <City>Stevenson</City>
        <State>WA</State>
        <Zip>98648</Zip>
        <Country>USA</Country>
        <Cell>509-427-5374</Cell>
        <Language>English</Language>
        <Sex>M</Sex>
        <Age>40</Age>
```

```
        </Body>
    </RegistrationContactInfoRequest>
```

Response Message (RegUser)

First, the user receives an error because their username "klevy" exists.

```
<RegistrationResponse>
    <Version>1</Version>
    <RtnCode>1</RtnCode>
    <URL>http://www.cmds.com/error/error6.html</URL>
    <Desc>
        Username is already registered.
        Please try a different username.
    </Desc>
</RegistrationResponse>
```

Then, they re-try with the user name "kenlevy", and it is successful.

```
<RegistrationResponse>
    <Version>1</Version>
    <RtnCode>0</RtnCode>
    <Desc>kenlevy</Desc>
</RegistrationResponse>
```

Resolution Message Examples

Resolve URLs

Resolving one URL is very similar, where the only change is that one URL is returned in the response message.
Request Message (ResURLs)

```
<ResolutionURLRequest>
    <Header>
        <Version>1</Version>
        <IDProviderID>123</IDProviderID>
        <RequestCode>ResURLs</RequestCode>
    </Header>
    <Body>
        <PrimaryInfo>
            <Timestamp>2005-04-14T13:20:00Z</Timestamp>
            <IDVersion>1</IDVersion>
            <CID>999</CID>
            <URLType>Full</URLType>
            <Response2ndInfo>TRUE</Response2ndInfo>
        </PrimaryInfo>
        <SecondaryInfo>
            <ReaderID>789</ReaderID>
            <TransactionID>235</TransactionID>
            <OS>Windows</OS>
            <Username>kenlevy</Username>
        </SecondaryInfo>
    </Body>
</ResolutionURLRequest>
```

Response Message (ResURLs)

```
<ResolutionResponse>
    <PrimaryInfo>
        <Version>1</Version>
        <RtnCode>0</RtnCode>
        <URL>
            www.disney.com/fantasia?
                IDProviderID=123:IDVersion=1:CID=999:
                ReaderID=789:ReaderID=789:OS=Windows:
                Username=kenlevy;
            www.disney.com/fantasia/music?
                IDProviderID=123:IDVersion=1:CID=999:
                ReaderID=789:ReaderID=789:OS=Windows:
                Username=kenlevy;
            www.amazon.com/search?fantasia?
                IDProviderID=123:IDVersion=1:CID=999:
                ReaderID=789:ReaderID=789:OS=Windows:
                Username=kenlevy;
        </URL>
        <Desc>
            Fantasia movie info from Disney.com;
            Fantasia music info from Disney.com;
            Fantasia memorabilia from Amazon.com;
        </Desc>
        <BizLogoURL>disney.com/CMDS/logo.jpg</BizLogoURL>
        <BizTemplateURL>disney.com/CMDS/template</BizTemplateURL>
    </PrimaryInfo>
    <SecondaryInfo>
        <Title>Fantasia</Title>
        <Copyright>1960</Copyright>
        <AdultFlag>0</AdultFlag>
        <ContentType>video-videotrack</ContentType>
        <ArtistEmail>fantasia@disney.com</ArtistEmail>
        <BizName>Disney</BizName>
        <BizURL>www.disney.com</BizURL>
    </SecondaryInfo>
</ResolutionResponse>
```

Resolve Router Address

Requesting the registration router address is very similar, where only the request code changes.
Request Message (ResResAddress)

```
<ResolutionAddressRequest>
    <Header>
        <Version>1</Version>
        <IDProviderID>123</IDProviderID>
        <RequestCode>ResResAddress</RequestCode>
    </Header>
    <Body>
        <Timestamp>2005-04-14T13:20:00Z</Timestamp>
        <ReaderIP>206.58.236.61</ReaderIP>
    </Body>
</ResolutionAddressRequest>
```

Response Message (ResResAddress)

```
<ResolutionResponse>
    <PrimaryInfo>
        <Version>1</Version>
        <RtnCode>0</RtnCode>
        <URL>198.70.207.6/CMDS/cgi_bin</URL>
    </PrimaryInfo>
</ResolutionResponse>
```

Error Text Examples

Some error text examples include:
1. "Content is registered, but no URL in database. Please contact <ContentProviderName> at <BizEmail>."
2. "Content is registered, but URL is marked as inactive. Please contact <ContentProviderName>."
3. "No record in database matching the content. Please contact <ContentProviderName> at <BizEmail>."
4. "Request format error—incomplete data. Please contact software provider."
5. "Primary URL is already registered. Please try again and verify settings, especially Primary and IDVersion."

6. "Username is already registered. Please try a different username."
7. "Password is not a valid format. It needs to be at least 6 characters with a number. Please try again."
8. "CID is already registered. Please verify the CID and ID Version and try again."
9. "CID is not registered. Please verify the Content Provider Name, ID Version and CID."
10. "CID is expired as content is out of date."

The system is very flexible and can enable multiple future possibilities. The enhancements include: (1) seed and interoperate multiple ID systems, and (2) enabling "buy now" links for illegitimate content. Another enhancement includes integrating multiple ID Provider technologies or cached Routers.

Seed and Interoperate with Multiple ID Systems

In a future version of the messages (e.g. with the number "2" in the Version XML header tag), the following steps could enable this system to seed and interoperate with multiple ID systems:

1. Add a registration request code to register other IDs that are linked to a CID
2. Add a resolution request code to return the other IDs
3. Add a resolution request code to return the CID given the other ID Even when the other IDs are returned, the receiving software needs to know how to register the other IDs with each proprietary system to enable seeding multiple systems from one piece of software.

Registration Request Message

Specifically, the following request code could be added to version 2 of the registration message:

Request Code: RegOtherIDs

| XML Tag | Format | Description | Status |
|---|---|---|---|
| ContentProviderName | Integer | Content provider name. | Required |
| Password | Text | Content provider password. | Required |
| IDVersion | Integer | The ID version provides the version of the CID algorithm. | Required |
| CID | Text | The unique content ID formatted according to the IDVersion. Since these requests are few, speed is not critical and integer CIDs are carried as text. | Required |
| W3C_URI | Text | World Wide Web Consortium (W3C) Uniform Resource Identifier (URI). http://www.ietf.org/rfc/rfc2396.txt. Format is text. | Optional |
| IDF_DOI | Text | International DOI Foundation (IDF) Digital Object Identifier (DOI). www.doi.org. Format is text. | Optional |
| OASIS_ERI | Text | OASIS's unique ID. http://www.oasis-open.org/who/ Format is text. | Optional |
| CISAC_CIS | Integer | International Confederation Of Societies Of Authors And Composers (CISAC) Common Information System (CIS). http://www.CISAC.org. Format is 96 bits. | Optional |
| ISO_ISRC | Text (12 chars) | The ISRC (International Standard Recording Code) was developed by ISO (International Organisation for Standardisation) to identify sound and audio-visual recordings. It is known as International Standard ISO 3901. http://www.iso.ch/cate/d9515.html. Format is 12 characters. | Optional |
| SMPTE_UMID | Integer | Society of Motion Picture Television Engineers (SMPTE) Unique Material Identifier (UMID). www.smpte.org 330M-2000. Format is 64 bits. | Optional |
| ISO-IEC_MPEG21_DII | Text | Moving Pictures Expert Group (MPEG) Digital Item Identification (DII). ISO/EC 21000-3. Format is text. | Optional |
| ISO_ISAN | Integer | ISO International Standard Audiovisual Number (ISAN). http://www.nlc-bnc.ca/iso/tc46sc9/isan.htm. Format is 64 bits. | Optional |
| ISO_V-ISAN | Integer | ISO Identifier for Versions of Audiovisual works. w4636 Format is 96 bits. | Optional |
| ISO_ISWC | Text (9 chars) | ISO Information System Work Code (ISWC). http://www.iswc.org. Format is 9 digits. | Optional |
| cIDf | Integer | Content ID Forum (cIDf). www.cidf.org. Format is 96 bits. | Optional |
| IFPI_Grid | Text (18 chars) | IFPI Global Release Identifier (GRid). www.ifpi.org/grid. The format is 18 characters. | Optional |
| EBU_WUMI | Integer | European Broadcast Union (EBU) Watermark Unique Material Identifier (WUMI). http://www.ebu.ch. Format is 64 bits. | Optional |
| Ad-ID | Text (12 chars) | Ad-ID LLC's advertising ID. www.aaaa.org. Format is 12 characters. | Optional |
| TVAnyTime_CRID | Text | TV Anytime's unique identifier. http://www.tv-anytime.org. Format is text. | Optional |
| CRF | Text | Content Reference Forum (CRF). www.crforum.org. Format is text. | Optional |
| ISO_ISBN | Integer (10 digits) | ISO International Standard Book Number (ISBN). Format is 10 digits. | Optional |
| ISO_ISSN | Integer (8 digits) | ISO International Standard Serial Number (ISSN). Format is 8 digits. | Optional |
| ISO_ISTC | Text | ISO International Standard Textual Work Code. Format is text (since not sure of format). | Optional |
| ONIX | Text | ONline Information eXchange (ONIX) http://www.editeur.org/onix.html. Format is text (since not sure of format). | Optional |

| XML Tag | Format | Description | Status |
|---|---|---|---|
| UCC_UPC | Integer (12 digits) | Uniform Code Council (UCC) Universal Product Code (UPC) www.uc-council.org. Format is 12 digits. | Optional |
| EPCGlobal_EPC | Integer | EPCGlobal Electronic Product Code (EPC). www.EPCGlobal.com. Format is 96 bits. | Optional |
| Symbol_PDF417 | Array (1.1 kBytes) | Symbol 2D bar code standard. Portable Document Format (PDF). Format is 1.1 kBytes. | Optional |
| Private | Binary | Binary data that can be used by the ID Provider for any private reason. | Optional |

Registration Response Message

For the request for registering other system ID (RegOtherIDs): the message returns a "0" for success in the RtnCode field—or "1" for error in the RtnCode, the error URL in the URL field, and the error text in the Desc field.

Resolution Request Message

The following resolution request codes could be added, with the corresponding response data:

Request Code: ResCIDGivenOtherID

This request uses the same format as used in ResURL, except the CID XML field contains the other ID data (and the CID is returned).

Request Code: ResOtherIDs

This request includes primary information, and uses the same data as for RegOtherIDs, except that the Content Provider ID and Password XML tags are optional. In addition, the Timestamp XML tag from the ResURL Request Code above is included as required fields.

Resolution Response Message

For requesting a CID given another unique ID (ResCIDGivenOtherID): the message returns a "0" for success in the RtnCode field, the CID in the Desc field, and the secondary information if requested—or "1" for error in the RtnCode, the error URL in the URL field, and the error text in the Desc field.

For requesting other unique IDs (ResOtherIDs): the message returns a "0" for success in the RtnCode field, and a list of the registered other IDs with each entry separated by a semicolon ";" each entry in the format consisting of the other system XML tag as defined for RegOtherIDs request code and related ID separated by a colon ":" in the Desc field, and the secondary information in the corresponding fields if requested—or "1" for error in the RtnCode, the error URL in the URL field, and the error text in the Desc field.

Database Elements

The corresponding database elements could be:

Unique ID Systems Database

| Label | IDProviderID | Version | CID | W3C URI | IDF DOI | OASIS ERI |
|---|---|---|---|---|---|---|
| Size | Integer | Integer | Integer or Tet | Tet | Tet | Tet |

| Label | CISAC CIS | ISRC | SMPTE UMID | ISO/IEC MPEG21 DII | | ISO ISAN | ISO VISAN |
|---|---|---|---|---|---|---|---|
| Size | Integer (96 bits) | Text (12 chars) | Integer (64 bits) | Text | | Integer (64 bits) | Integer (96 bits) |

| Label | ISO ISWC | cIDf | | IFPI Grid | EBU WUMI | Ad-ID | TV AnyTime CRID | CRF |
|---|---|---|---|---|---|---|---|---|
| Size | Text (9 digits) | Integer (96 bits) | | Text (18 chars) | Integer (64 bits) | Text (12 chars) | Text | Text |

| Label | ISO ISBN | ISO ISSN | ISO ISTC | ONIX | UCC UPC | UCC EPC | Symbol PDF 417 |
|---|---|---|---|---|---|---|---|
| Size | Integer (10 digits) | Integer (8 digits) | Text? | Text? | Integer (12 digits) | Integer (96 bits) | Array (1.1 kBytes) |

"Buy Now" for Illegitimate Content

When the multimedia player goes to play or transfer raw content (i.e. neither encrypted nor digitally signed), it calls the reader plug-in to check for a CID and whether or not the content is copy protected. If this raw content is copy protected and contains a CID, an explanation and "buy now" link can be provided to the user.

Note that the existence of a CID does not necessarily mean that the content cannot be played, as the consumer may have converted a purchased CD to compressed audio, or bought non-encrypted content. The content needs to also have a copy protection identifier, such as Copy Control Information (CCI) in the content ID, such as DWM, payload. The Player can log this event so it only checks raw content once.

By including a rights' flag linked to URLs, one primary rights URL can be registered using existing registration requests, and the rights URL can be returned to the reader to offer a "buy now" link to purchase legitimate content. Specifically, the rights flag is an additional XML field in registration and resolution messages, and is included in the database elements with the URLs.

Universal Reader Interface

When content owners and retailers are both acting as Content Providers, thus, both marking the content with their own CID, the user sees two different "more info" buttons, one from the content owner and one from the retailer. There could even be an additional "more info" button from the distributor, such as ISP.

The Registration Authority could, in the future, provide a plug-in that provides a universal reader interface that integrates CIDs and URLs from different ID Provider detectors. This example implementation could be expanded to include a standard reader-application interface, which is the interface between a generic reader plug-in and ID Provider detector. Thus, all installed ID technology detectors could call (or be called from) the generic reader plug-in, and all CIDs sent to a Router from the generic reader plug-in.

Not only would the interface be specified for this generic reader plug-in, but the Registration Authority would also have to provide the plug-in for distribution for all multimedia players. The generic plug-in could have the ID provider plug-ins call it with their resolution request XML messages, then display one "more info" button for the user, and finally send requests for all detected CIDs to a Router. This approach would only require the ID Provider plug-ins to change their call from an IP address to an internal DLL, and remove their user display.

Cached Routers

The architecture enables Mirror Routers to link to Cached Routers for resolution requests. Cached Routers are not applicable to registration requests since these requests occur neither often nor repetitively, and are immediately forwarded to the Central Router. These Cached Routers will temporarily maintain their Cached Database for recent resolution requests. It is expected that the data will have a time limit set by the Registration Authority. The Cached Routers will also send usage information to their linked Mirror Router daily. This architecture becomes truly distributed and efficient.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated. The inventor submits that the invention encompasses the claims set forth below, as well as systems and computer readable mediums that implement these methods. The embodiments described in this document are also inventive and applicant reserves the right to claim various embodiments and combinations thereof as its invention.

I claim:

1. A method comprising:
   in a database system executing on one or more computers, registering different content ID schemas, the registering of the different content ID schemas comprising registering bounding identifiers corresponding to the different content ID schemas;
   in the database system, registering a set of content identifiers for each of the different content ID schemas, wherein the content identifiers in a content ID schema correspond to content objects identified by the content ID schema, and the content identifiers are obtained based on identifying information derived by a programmed processor from audio or visual content signals obtained from the corresponding content objects;
   forming a globally unique identifier for each of the content objects identified by the different content ID schemas by combining a bounding identifier of the corresponding content ID schema and the content identifier from the same corresponding content ID schema;
   for each of the globally unique identifiers, maintaining routing information to a metadata source, the metadata source executing on one or more computers;
   receiving a first content identifier for a first content object; the first content identifier being from a corresponding first content ID schema from the different content ID schemas, the first content identifier being obtained based on first identifying information derived by a programmed processor from an audio or visual content signal obtained from the first content object;
   determining a first bounding identifier for the corresponding first content ID schema, the first bounding identifier being separate from the first content identifier;
   using the determined first bounding identifier in combination with the first content identifier obtained based on the identifying information to form the globally unique identifier for the first content identifier; and
   routing a user device to the metadata source associated with the globally unique identifier for the first content object using the routing information.

2. The method of claim 1 wherein the content identifiers from the different content ID schemas, and having different associated bounding identifiers, are derived from the content object using different readers corresponding to the different associated bounding identifiers.

3. The method of claim 2 wherein the different readers derive the content identifiers using different content identification methods.

4. The method of claim 2 wherein the different readers derive the content identifiers using different attributes of the content object.

5. The method of claim 4 wherein the different attributes comprise different types of embedded auxiliary data.

6. The method of claim 5 wherein one of the types of embedded auxiliary data comprises a digital watermark.

7. The method of claim 4 wherein the different attributes comprise a first attribute corresponding to a first digital watermark and a second attribute corresponding to a second digital watermark.

8. The method of claim 4 wherein different attributes comprise attributes from which different digital watermarks or robust hashes are derived.

9. The method of claim 4 wherein the different attributes comprise in band and out of band attributes of the content object, where in band refers to content that is rendered for perception by a human and out of band refers to auxiliary data carried in the content object but not forming part of the content that is rendered for perception by a human.

10. The method of claim 1 wherein the first content ID schema is determined by a reader used to provide the first content identifier, the content object having more than one content identifier, each readable by a different reader.

11. The method of claim 1 wherein the content identifiers are derived from the content object using different parts of the content object.

12. The method of claim 11 wherein the parts are different in band parts of perceptual content in the content object.

13. The method of claim 11 wherein one part is in band and another part is out of band in the content object.

14. The method of claim 1 wherein said first content identifier and said metadata source is provided by a content provider, and includes links to the content provider's metadata, and wherein there is also a second content identifier and second metadata source provided by a second participant that links to the second participant's metadata.

15. The method of claim 14 wherein said second participant is a retailer and the second participant's metadata includes online commerce opportunities.

16. The method of claim 1 wherein the content objects comprise physical objects, and the content signals are images captured from the physical objects.

17. A non-transitory, computer readable medium on which is stored instructions, which, when executed by one or more computers, performs a method comprising:
   in a database system executing on one or more computers, registering different content ID schemas, the registering of the different content ID schemas comprising registering bounding identifiers corresponding to the different content ID schemas;
   in the database system, registering a set of content identifiers for each of the different content ID schemas, wherein the content identifiers in a content ID schema correspond to content objects identified by the content ID schema, and the content identifiers are obtained based on identifying information derived by a programmed processor from audio or visual content signals obtained from the corresponding content objects;
   forming a globally unique identifier for each of the content objects identified by the different content ID schemas by combining a bounding identifier of the corresponding content ID schema and the content identifier from the same corresponding content ID schema;
   for each of the globally unique identifiers, maintaining routing information to a metadata source, the metadata source executing on one or more computers;
   receiving a first content identifier for a first content object; the first content identifier being from a corresponding first content ID schema from the different content ID schemas, the first content identifier being obtained based on first identifying information derived by a programmed processor from an audio or visual content signal obtained from the first content object;
   determining a first bounding identifier for the corresponding first content ID schema, the first bounding identifier being separate from the first content identifier;
   using the determined first bounding identifier in combination with the first content identifier obtained based on the identifying information to form the globally unique identifier for the first content identifier; and
   routing a user device to the metadata source associated with the globally unique identifier for the first content object using the routing information.

18. A system of associating a content object with two or more different metadata sources, the system comprising:
   a directory system comprising one or more computers for registering different content ID schemas, the registering of the different content ID schemas comprising registering bounding identifiers corresponding to the different content ID schemas;
   the one or more computers of the database system configured to register a set of content identifiers for each of the different content ID schemas, wherein the content identifiers in a content ID schema correspond to content objects identified by the content ID schema, and the content identifiers are obtained based on identifying information derived by a programmed processor from audio or visual content signals obtained from the corresponding content objects;
   the one or more computers of the database system configured to form a globally unique identifier for each of the content objects identified by the different content ID schemas by combining a bounding identifier of the corresponding content schema and the content identifier from the same corresponding content ID schema;
   a database comprising one or more computers for maintaining routing information to a metadata source for each of the globally unique identifiers;
   a router for receiving a first content identifier for a first content object, the first content identifier being from a corresponding first content ID schema from the different content ID schemas, the first content identifier being obtained based on first identifying information derived by a programmed processor from an audio or visual content signal obtained from the first content object;
   the router determining a first bounding identifier for the corresponding first content ID schema, the first bounding identifier being separate from the first content identifier, and using the determined first bounding identifier in combination with the first content identifier obtained based on the identifying information to form the globally unique identifier for the first content identifier, and for directing a user device to the metadata source associated with globally unique identifier using the routing information.

19. The system of claim 18 wherein the content identifiers from the different content ID schemas, and having different associated bounding identifiers, are derived from the content object using different readers corresponding to the different associated bounding identifiers.

20. The system of claim 19 wherein the different readers derive the content identifiers using different content identification methods.

21. The system of claim 19 wherein the different readers derive the content identifiers using different attributes of the content object.

22. The system of claim 21 wherein the different attributes comprise different types of embedded auxiliary data.

23. The system of claim 22 wherein one of the types of embedded auxiliary data comprises a digital watermark.

24. The system of claim 21 wherein the different attributes comprise a first attribute corresponding to a first digital watermark and a second attribute corresponding to a second digital watermark.

25. The system of claim 21 wherein different attributes comprise attributes from which different digital watermarks or robust hashes are derived.

26. The system of claim 21 wherein the different attributes comprise in band and out of band attributes of the content object, where in band refers to content that is rendered for perception by a human and out of band refers to auxiliary data carried in the content object but not forming part of the content that is rendered for perception by a human.

27. The system of claim 18 wherein the first content ID schema is determined by a reader used to provide the first content identifier, the content object having more than one content identifier, each readable by a different reader.

28. The system of claim 18 wherein the content identifiers are derived from the content object using different parts of the content object.

29. The system of claim 28 wherein the parts are different in band parts of perceptual content in the content object.

30. The system of claim 28 wherein one part is in band and another part is out of band in the content object.

31. The system of claim 18 wherein said first content identifier and said metadata source is provided by a content provider, and includes links to the content provider's metadata, and wherein there is also a second content identifier and second metadata source provided by a second participant that links to the second participant's metadata.

32. The system of claim 31 wherein said second participant is a retailer and the second participant's metadata includes online commerce opportunities.

33. The system of claim 18 wherein the content objects comprise physical objects, and the content signals are images captured from the physical objects.

34. A system of associating a content object with two or more different metadata sources, the system comprising:
   means for registering different content ID schemas, the registering of the different content ID schemas comprising registering bounding identifiers corresponding to the different content ID schemas;
   means for registering a set of content identifiers for each of the different content ID schemas, wherein the content identifiers in a content ID schema correspond to content objects identified by the content ID schema, and the content identifiers are obtained based on identifying information derived by a programmed processor from audio or visual content signals obtained from the corresponding content objects;
   means for generating a globally unique identifier for each of the content objects identified by the different content ID schemas by combining a bounding identifier of the corresponding content schema and the content identifier from the same corresponding content ID schema;
   means for maintaining routing information to a metadata source for each of the globally unique identifiers;
   means for obtaining a first content identifier for a first content object, the first content identifier being from a corresponding first content ID schema from the different content ID schemas, the first content identifier being obtained based on first identifying information derived by a programmed processor from an audio or visual content signal obtained from the first content object;
   means for generating a first bounding identifier for the corresponding first content ID schema, the first bounding identifier being separate from the first content identifier, and using the generated first bounding identifier in combination with the first content identifier obtained based on the identifying information to form the globally unique identifier for the first content identifier, and
   means for directing a user device over a communications network to the metadata source associated with globally unique identifier using the routing information.

35. The system of claim 34 wherein the content objects comprise physical objects, and the content signals are images captured from the physical objects.

36. The system of claim 35 wherein the identifying information comprises digital watermarks embedded in images on the physical objects, and the digital watermarks are decoded from the images to derive the identifying information.

37. The system of claim 34 wherein the content objects comprise audio, and the content signals are audio signals captured by a microphone from rendered playback of the audio.

38. The system of claim 37 wherein the identifying information comprises digital watermarks embedded in the audio, and the digital watermarks are decoded from the audio signals to derive the identifying information.

* * * * *